(12) United States Patent
Matthews et al.

(10) Patent No.: US 10,218,589 B1
(45) Date of Patent: Feb. 26, 2019

(54) EFFICIENT RESOURCE STATUS REPORTING APPARATUSES

(71) Applicant: Innovium, Inc., San Jose, CA (US)

(72) Inventors: William Brad Matthews, San Jose, CA (US); Puneet Agarwal, Cupertino, CA (US)

(73) Assignee: Innovium, Inc., San Jose, CA (US)

(*) Notice: Subject to any disclaimer, the term of this patent is extended or adjusted under 35 U.S.C. 154(b) by 254 days.

(21) Appl. No.: 14/973,541

(22) Filed: Dec. 17, 2015

(51) Int. Cl.
*G06F 15/16* (2006.01)
*H04L 12/26* (2006.01)
*H04L 12/911* (2013.01)

(52) U.S. Cl.
CPC ............ *H04L 43/06* (2013.01); *H04L 43/16* (2013.01); *H04L 47/70* (2013.01)

(58) Field of Classification Search
CPC .......... H04L 43/06; H04L 43/16; H04L 47/70
USPC ........................................ 709/223, 224, 202
See application file for complete search history.

(56) References Cited

U.S. PATENT DOCUMENTS

| | | | |
|---|---|---|---|
| 3,673,395 A | | 6/1972 | Tripp |
| 4,985,859 A | * | 1/1991 | Rauner .................. G01P 3/489 324/166 |
| 5,457,793 A | * | 10/1995 | Elko ...................... G06F 12/084 707/688 |
| 5,724,362 A | | 3/1998 | Lau |
| 5,923,247 A | | 7/1999 | Dowden et al. |
| 6,363,411 B1 | * | 3/2002 | Dugan .............. H04M 3/42136 379/201.01 |
| 6,400,715 B1 | * | 6/2002 | Beaudoin ................ H04L 49/25 370/392 |
| 6,527,370 B1 | | 3/2003 | Courian et al. |
| 6,646,604 B2 | * | 11/2003 | Anderson ................. G01S 5/02 342/465 |
| 6,766,338 B1 | | 7/2004 | Handley et al. |
| 6,779,030 B1 | * | 8/2004 | Dugan .............. H04M 3/42136 379/221.08 |
| 7,246,156 B2 | | 7/2007 | Ginter et al. |

(Continued)

OTHER PUBLICATIONS

United States Patent and Trademark Office, U.S. Appl. No. 14/958,830, Non-Final Office Action dated Sep. 14, 2017.

(Continued)

*Primary Examiner* — Thu Ha T Nguyen
(74) *Attorney, Agent, or Firm* — Wong & Rees LLP; Karl T. Rees

(57) ABSTRACT

Described techniques enable the tracking and reporting of resource utilization at multiple levels of granularity, the highest of which involves tracking resource usage by a particular object in aggregate. When aggregate usage for the particular object is within certain parameters, actual resource usage is not reported at the lower level of granularity, but is replaced by placeholder values. When aggregate usage for the particular object exceeds a threshold, the particular object is considered to be a "hot spot." Resource usage for the particular object can then be reported (and tracked, if not already) at the lower level of granularity until the particular object is no longer a "hot spot." The efficiency of the tracking may be further enhanced by leveraging a bifurcated counting mechanism in which a full count is updated only at selected sample times, with intermediate counters used to store changes in between sample times.

26 Claims, 9 Drawing Sheets

(56) References Cited

U.S. PATENT DOCUMENTS

| | | | |
|---|---|---|---|
| 7,855,960 B2 | 12/2010 | Hinosugi et al. | |
| 7,890,509 B1* | 2/2011 | Pearcy | G06Q 10/06 |
| | | | 702/5 |
| 7,921,024 B2 | 4/2011 | Hogan et al. | |
| 8,200,527 B1 | 6/2012 | Thompson et al. | |
| 8,270,952 B2 | 9/2012 | Raleigh | |
| 8,776,061 B2* | 7/2014 | Levin | G06F 9/5016 |
| | | | 718/100 |
| 9,077,758 B1* | 7/2015 | McGovern | H04L 63/14 |
| 9,401,869 B1 | 7/2016 | Tang et al. | |
| 9,420,002 B1* | 8/2016 | McGovern | H04L 63/10 |
| 9,753,749 B2 | 9/2017 | Gaston et al. | |
| 9,813,285 B1* | 11/2017 | McGovern | H04L 41/00 |
| 9,929,970 B1* | 3/2018 | Matthews | H04L 47/70 |
| 2002/0065864 A1* | 5/2002 | Hartsell | H04L 41/5009 |
| | | | 718/100 |
| 2003/0110344 A1* | 6/2003 | Szczepanek | H04L 12/40013 |
| | | | 711/100 |
| 2004/0078105 A1* | 4/2004 | Moon | G06Q 10/10 |
| | | | 700/100 |
| 2006/0126201 A1* | 6/2006 | Jain | H04L 67/1095 |
| | | | 360/15 |
| 2006/0294252 A1 | 12/2006 | Shoji et al. | |
| 2007/0140301 A1* | 6/2007 | Kailash | H04L 43/024 |
| | | | 370/498 |
| 2007/0174428 A1 | 7/2007 | Lev Ran et al. | |
| 2008/0117816 A1 | 5/2008 | Stone et al. | |
| 2008/0183532 A1* | 7/2008 | Barnard | G06Q 10/063 |
| | | | 705/7.14 |
| 2008/0201468 A1 | 8/2008 | Titus | |
| 2008/0243993 A1* | 10/2008 | Wang | H04L 29/12113 |
| | | | 709/203 |
| 2009/0172682 A1* | 7/2009 | Bobak | H04L 69/40 |
| | | | 718/103 |
| 2009/0282096 A1 | 11/2009 | Kamrowski et al. | |
| 2010/0228854 A1 | 9/2010 | Morrison et al. | |
| 2011/0078519 A1 | 3/2011 | Yordanov et al. | |
| 2012/0278464 A1 | 11/2012 | Lehane et al. | |
| 2014/0270163 A1* | 9/2014 | Merchan | H04L 9/0637 |
| | | | 380/46 |
| 2015/0133076 A1 | 5/2015 | Brough | |
| 2016/0014039 A1* | 1/2016 | Reddy | H04L 67/38 |
| | | | 709/224 |
| 2017/0060769 A1* | 3/2017 | Wires | H04L 12/6418 |
| 2017/0149931 A1* | 5/2017 | Lochhead | H04L 67/327 |
| 2017/0235622 A1 | 8/2017 | Boyapalle et al. | |
| 2017/0235848 A1* | 8/2017 | Van Dusen | H04L 41/04 |
| | | | 705/12 |
| 2017/0257303 A1 | 9/2017 | Boyapalle et al. | |
| 2017/0288955 A1 | 10/2017 | Yin | |
| 2017/0344045 A1 | 11/2017 | Forbes | |
| 2018/0167307 A1* | 6/2018 | Barry | H04L 29/06 |

OTHER PUBLICATIONS

United States Patent and Trademark Office, U.S. Appl. No. 14/958,830, Notice of Allowance dated Jan. 10, 2018.

United States Patent and Trademark Office, U.S. Appl. No. 15/290,769, Non-Final Office Action dated May 23, 2018.

United States Patent and Trademark Office, U.S. Appl. No. 14/985,928, Final Office Action dated Sep. 19, 2018.

United States Patent and Trademark Office, U.S. Appl. No. 15/290,769, Non-Final Office Action dated Sep. 18, 2018.

* cited by examiner

| | 862a Full | 866 Thr |
|---|---|---|
| O1 | 0000147 | 0000200 |
| O2 | 0002987 | 0002000 |
| O3 | 0000013 | 0000200 |
| O4 | 0000401 | 0000400 |
| O5 | 0000898 | 0000900 |
| O6 | 0000096 | 0000200 |
| O7 | 0000002 | 0000200 |
| O8 | 0032548 | 0064000 |

| | 872a Int | 876a Sta |
|---|---|---|
| O1 | 00 | 0 |
| O2 | 00 | 1 |
| O3 | 08 | 0 |
| O4 | -07 | 1 |
| O5 | 03 | 0 |
| O6 | 02 | 0 |
| O7 | -02 | 0 |
| O8 | -01 | 0 | t1

| | 862b Full | 866 Thr |
|---|---|---|
| O1 | 0000147 | 0000200 |
| O2 | 0002987 | 0002000 |
| O3 | 0000021 | 0000200 |
| O4 | 0000394 | 0000400 |
| O5 | 0000898 | 0000900 |
| O6 | 0000096 | 0000200 |
| O7 | 0000002 | 0000200 |
| O8 | 0032548 | 0064000 |

| | 872b Int | 876b Sta |
|---|---|---|
| O1 | 01 | 0 |
| O2 | -01 | 1 |
| O3 | 00 | 0 |
| O4 | 00 | 0 |
| O5 | 04 | 0 |
| O6 | 01 | 0 |
| O7 | 00 | 0 |
| O8 | -03 | 0 | t2

| | 862c Full | 866 Thr |
|---|---|---|
| O1 | 0000147 | 0000200 |
| O2 | 0002987 | 0002000 |
| O3 | 0000021 | 0000200 |
| O4 | 0000394 | 0000400 |
| O5 | 0000902 | 0000900 |
| O6 | 0000097 | 0000200 |
| O7 | 0000002 | 0000200 |
| O8 | 0032548 | 0064000 |

| | 872c Int | 876c Sta |
|---|---|---|
| O1 | 00 | 0 |
| O2 | -03 | 1 |
| O3 | 02 | 0 |
| O4 | 00 | 0 |
| O5 | 00 | 1 |
| O6 | 00 | 0 |
| O7 | 01 | 0 |
| O8 | -05 | 0 | t3

| | 862d Full | 866 Thr |
|---|---|---|
| O1 | 0000147 | 0000200 |
| O2 | 0002987 | 0002000 |
| O3 | 0000021 | 0000200 |
| O4 | 0000394 | 0000400 |
| O5 | 0000902 | 0000900 |
| O6 | 0000097 | 0000200 |
| O7 | 0000003 | 0000200 |
| O8 | 0032543 | 0064000 |

| | 872d Int | 876d Sta |
|---|---|---|
| O1 | 02 | 0 |
| O2 | -02 | 1 |
| O3 | 04 | 0 |
| O4 | 01 | 0 |
| O5 | -01 | 1 |
| O6 | -01 | 0 |
| O7 | 00 | 0 |
| O8 | 00 | 0 |

EFFICIENT RESOURCE STATUS REPORTING APPARATUSES

CROSS-REFERENCE TO RELATED APPLICATIONS

This application is related to U.S. patent application Ser. No. 14/958,830, entitled "Efficient Resource Tracking," by Matthews et al., filed Dec. 3, 2015; the entire contents of which are hereby incorporated by reference for all purposes as if fully set forth herein.

TECHNICAL FIELD

Embodiments relate generally to resource monitoring, and, more specifically, to techniques for efficiently reporting shared resource utilization in a computer system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer systems may include a number of shared resources, such as memories, processors, storage units, network bandwidth, interfaces, and so forth. These resources are described as shared because they may be utilized by or on behalf of multiple logical or physical components of a computer system. For instance, in the context of a network switching device, usage of certain memory areas may be logically divided amongst different ports, queues, or other components of the device. Individual portions of these memory areas, referred to herein as buffers, may be utilized by or on behalf of device components to, for example, temporarily store network packets, cells, data frames, or other messages for processing. At a given time, each buffer may be classified as belonging to, being assigned to, or being utilized by one or more different physical or logical component of the networking device, such as a port, queue, group of ports, traffic class, and so forth. This classification will typically change over time, as the resource is repeatedly assigned, unassigned, and reassigned to different components for various purposes.

It is sometimes, for various reasons, useful to account for the resources utilized for a component or objective at any given time. For example, a resource management component may allocate different amounts of a type of resource (e.g. a number of buffers, a memory size, a number of processors or threads, an amount of processor usage, bandwidth, etc.) for different objectives, and track the amounts of resources currently utilized for each objective. As another example, it may be useful to provide a reporting mechanism by which system configuration logic and/or system administrators may identify, investigate, and/or respond to inefficient or otherwise undesirable resource utilization within a system. For instance, in the context of a network switching device, a network port can become congested and drop packets quickly without a user having any insight into why the packets were dropped. It may be useful to provide a network administrator with mechanisms for identifying the congestion so as to quickly determine whether existing configurations and/or traffic patterns should change to address observed issues.

However, the tasks of accounting for resources and reporting their utilization itself requires an amount of resources. For example, in a system comprised of many network devices being monitored by a central administrative application or device, the centralized collection of accounting statistics from the network devices represents an additional burden on network resources, such as network bandwidth. As another example, an amount of memory is required for accounting purposes, such as for tracking the current amount of resources utilized for each objective. Of course, as the number of objectives to which a type of resource may be assigned increases, the memory requirements also increase. Moreover, for certain types of usage patterns in certain types of computer systems, such as with respect to message buffers in network switching devices, the frequency with which resource assignments must be made requires that the memory used to track resource usage be capable of sustaining a high read and write rate. For instance, multi-ported memory is often required in such contexts, which can be of relatively high cost and reduced operating rate.

BRIEF DESCRIPTION OF THE DRAWINGS

The present invention is illustrated by way of example, and not by way of limitation, in the figures of the accompanying drawings and in which like reference numerals refer to similar elements and in which:

FIG. 8 illustrates an example set of counters and status information changing over time in accordance with the described techniques.

DETAILED DESCRIPTION

Figure 1:
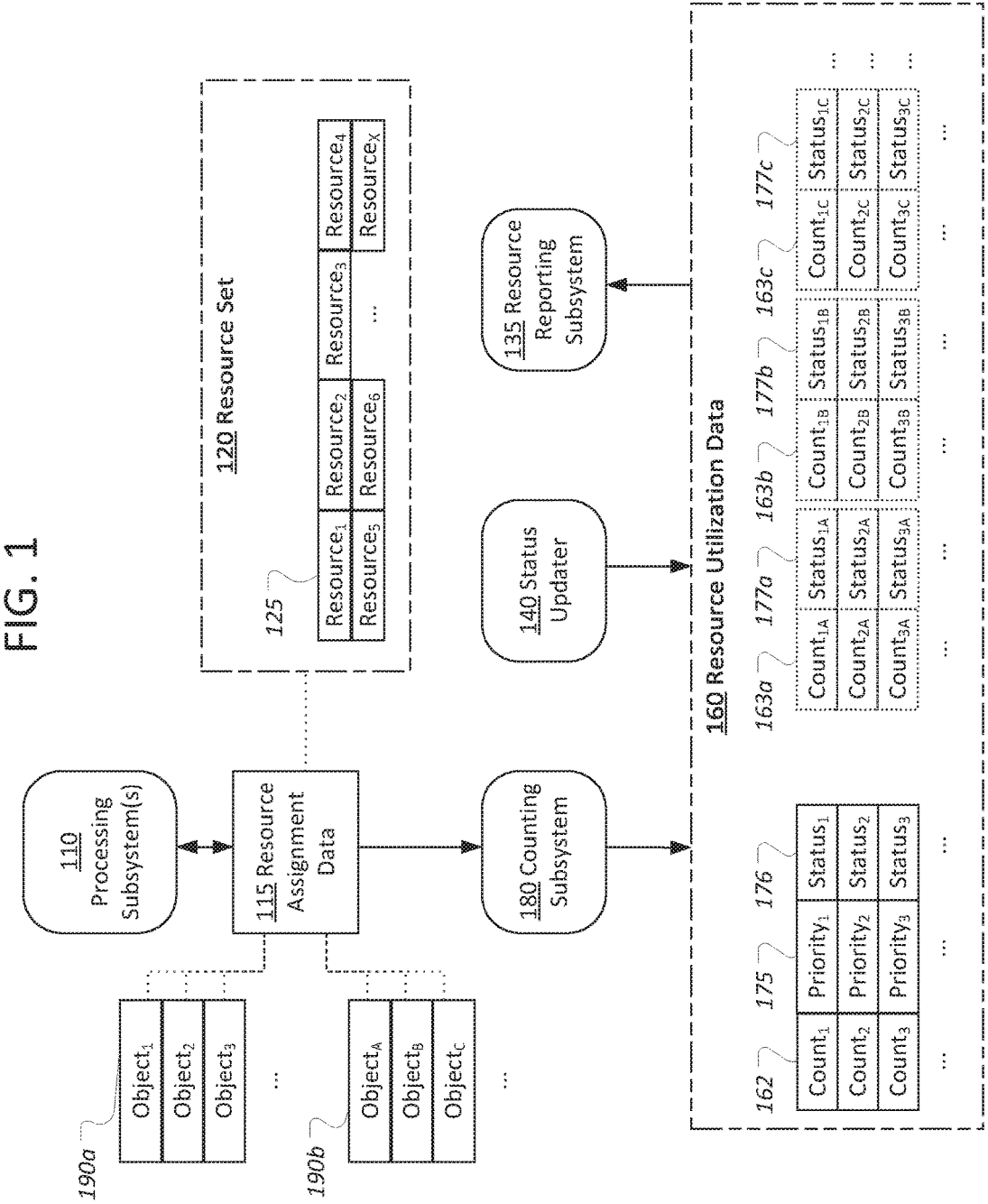
FIG. 1 is an illustrative view of various aspects of an example system in which the techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
2.1. Resources
2.2. Objects 2.3. Counting Subsystem
2.4. Status Updater
2.5. Reporting Subsystem
2.6. Example Report (2D Heat map)
2.7. Network-Based Reporting System
2.8. Example Counting Subsystem
2.9. Miscellaneous
3.0. Functional Overview
3.1. Reporting Flow with Optimized Tracking
3.2. Reporting Flow with Optimized Communication
3.3. Optimized Counting Techniques
3.4. General Counting Flow
4.0. Implementation Examples
4.1. Heat maps for Network Switching Devices
4.2. Example Update Selection Techniques
4.3. Example Counting Walk-through
5.0. Example Embodiments
6.0. Implementation Mechanism—Hardware Overview
7.0. Extensions and Alternatives 1.0. GENERAL OVERVIEW Approaches, techniques, and mechanisms are disclosed for tracking, reporting, and/or managing shared resource utilization in a computer system. According to an embodiment, resources utilized for combinations of objects are effectively communicated without the cost of maintaining and/or transmitting a matrix or other data structure that includes a count or state for each of the combinations. The state or count of resource utilization for certain objects is tracked. While the state or count of resource utilization for a particular one of these objects remains within certain parameters, which may be general or specific to the particular object, the count and state of any combination of objects that includes the particular object need not be reported or even necessarily tracked. However, when the state or count of resource utilization for a particular one of these objects falls outside of these certain parameters (e.g. exceeding a threshold, being in a problematic state, etc.), the count and/or state of some or all combinations of objects that include the particular object are tracked (if not already being tracked) and reported.

Put another way, resource utilization may be tracked at multiple levels of granularity, the highest of which involves tracking resource usage by a particular object in aggregate. When aggregate usage for the particular object is within certain parameters, actual resource usage is not reported at the lower level of granularity, but is instead considered to be uniform and/or insignificant for reporting purposes. When aggregate usage for the particular object exceeds a threshold, the particular object is considered to be a "hot spot." Resource usage for the particular object can then be reported (and tracked, if not already tracked) at a lower level of granularity, such as for specific classes of use, specific associated components, specific sub-objectives, and so forth, until the particular object is no longer a "hot spot." The techniques need not be limited to two-dimensional combinations of objects, but may be used for three, four, or even more levels of granularity.

As an example, congestion levels may be effectively communicated for each possible combination of an ingress port of a network device with an egress port of the network device via a heat map, table, or other suitable structure. Rather than send or even necessarily track the congestion level for each combination through a two-dimensional matrix of ingress and egress ports, congestion may be tracked, in aggregate, for only the ingress ports and/or for only the egress ports. When the aggregate congestion level for a given ingress or egress port is within parameters deemed as normal for that port, which may vary based on the port, congestion levels need not actually be tracked and reported for each individual ingress/egress port combination that includes the port. Instead, the congestion levels for each of the ingress/egress port combinations may be assumed to have a default or uniform value. When the aggregate congestion level for a given ingress port or egress port is within parameters deemed not normal for that port, congestion levels may be tracked and/or reported for each individual ingress/egress port combination. Similar techniques may be utilized to report resource utilization within a network device for any other combination of components of interest, such as ports and service classes, addresses and message types, and so forth.

The efficiency of the tracking may be further enhanced by leveraging a bifurcated counting mechanism in which a full count is updated only at selected sample times, with intermediate counters used to store changes in between sample times. For example, certain techniques described herein enable resource accounting and tracking in high access rate systems using low cost memories. In at least some embodiments, the techniques shift at least some of the memory requirements for resource accounting and tracking mechanisms to lower cost memories, at the cost of an acceptable reduction in accuracy at a given moment in time on account of potential delays in updates to the accounting and tracking mechanisms.

According to an embodiment, resource usage is tracked at least partially through the use of counters. Two sets of counters are maintained for a set of resources, each set of counters having varying resolution and access capabilities. A first set of counters, also known as full resolution counters, full status counters, or full counters, is maintained in relatively lower cost memories. The full counters generally indicate the amount of resources used for each object in a set of objects (e.g. ports, queues, groups, categories, threads, etc.), but on a potentially delayed basis. A second set of counters of smaller size, also known as intermediate counters, delta counters, or shallow counters, is stored in a relatively higher cost memory that supports high arrival and departure rates for accurate accounting. Each intermediate counter indicates the amount of resources assigned (or unassigned) to an object since the object's full counter was last updated, and is updated whenever this amount changes. A background process is configured to update individual full counters from the corresponding intermediate counters on a periodic or other basis. The exact times at which a given full counter is updated may vary in accordance with a variety of suitable algorithms, such as those described herein.

The exact types of memories used to store the counters may vary between embodiments, so long as the memory used to store the intermediate counters supports higher read and/or write access rates than the memory used to store the full counters.

Reporting, access control, and/or other logic may involve utilizing the full counters to determine various status information for an object relative to a type of resource, in spite of the fact that the full counters are not always up-to-date. This status information may indicate whether the object is in one or more defined states, depending on the implementation. Each given state is associated with a threshold. If the full counter is over the threshold, the object is said to be in the given state. In an embodiment, some or all of the status information for an object may be determined and stored when the full counter is updated, so that the determination need not be repeated until the next update to the full counter, thus avoiding or at least reducing the need to read the full counter between updates. In an embodiment, the status information for an object may be stored in any memory having faster read access than the memory used to store the full counter for the object, including without limitation the same memory used to store the intermediate counter for the object.

In an embodiment, different thresholds may exist for the same state for different objects. For example, in the context of a networking device, one port may be considered congested when it has been assigned more than X buffers, while another may be considered congested when it has been assigned more than Y buffers. In an embodiment, all objects have the same threshold for a given state. Depending on the embodiment, the state thresholds may be pre-configured, and/or updated over time in accordance with various rules and algorithms. In an embodiment, the thresholds may be stored in a memory of relatively low cost, including without limitation the same memory used to store the full counters.

In other aspects, the invention encompasses computer apparatuses and computer-readable media configured to carry out the foregoing techniques. Although the techniques described herein may be utilized in any system comprising any number of resources, objects, and computing devices, in one embodiment the techniques described herein may be more specifically applied to managing per-port or per-queue message buffers in a networking device such as a router or switch. The buffered messages need not necessarily be complete "messages" from the perspective of an end-user, but rather than the term message as used herein should be understood to refer to any unit of data involved in a transmission, such as segments, packets, data frames, cells, datagrams, and so forth.

2.0. STRUCTURAL OVERVIEW

FIG. 1 is an illustrative view of various aspects of an example system 100 in which the techniques described herein may be practiced, according to an embodiment. System 100 comprises one or more computing devices. These one or more computing devices comprise any combination of hardware and software configured to implement the various logical components described herein, including components 110-190. For example, system 100 may comprise a single computing device in which some or all of the processing components described herein are implemented using application-specific integrated circuits (ASICs) or field programmable gate arrays (FPGAs). As another example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

2.1. Resources

System 100 comprises a resource set 120 of resources 125. Resources 125 are each of a common resource type. Example resource types include, without limitation, buffers or other units of memory, processors, threads, interfaces, units of network bandwidth, units of processor utilization, I/O operations, computing devices, network resources, and so forth. Resource set 120 may include any number of resources 125.

System 100 further comprises one or more processing subsystems 110. A processing subsystem 110 is a set of hardware components, such as ASICs or FPGAs, and/or software-based processes executed by one or more processors. A processing subsystem 110 is configured to perform some task at least using resources 125 assigned from resource set 120. A processing subsystem 110 may be configured to perform any suitable task. However, the one or more processing subsystems 110 are collectively configured to perform tasks with respect to a number of objects 190.

For instance, within the context of managing per-port or per-queue message buffers in a networking device, processing subsystem 110 may be or include, without limitation, one or more of: a routing subsystem configured to forward routable messages to next destinations, a buffering component configured to buffer messages while waiting for a port or interface to become available to send the messages, a firewall subsystem configured to apply firewall rules and/or inspect packets, a packet manipulation subsystem, a general purpose processor, a traffic control subsystem, and so forth. Of course, the types of processing subsystems 110 that may be implemented may take a variety of other forms, and many embodiments are not limited to any specific type of processing subsystem 110.

More generally, processing subsystem 110 may be any subsystem that maps objects 190 to assigned resources 120, using a one-to-one mapping, one-to-many mapping, or many-to-many mapping policy, based on the resources and/or user preferences. To this end, some processing subsystems 110 may include or be coupled to a resource assignment subsystem, such as described in other sections.

2.2. Objects

Techniques described herein function to track and report the amount of resources that needed by the one or more processing subsystems 110 for or in association with a given object 190. Each object 190 corresponds to different and distinct task, function, or objective. An object 190 may be an actual physical or logical component of system 100, such as a processor, incoming or outgoing port, interface, computing device, and so forth. Thus, for instance, the amount of resources 190 that may be utilized for a given processor, port, or interface may be regulated in accordance with the techniques described herein. Or, an object 190 may correspond to any other suitable function or objective, such as queues, software processes or threads, data structures, classes or categories of operations, network addresses or subnets, defined groups of objects, and so forth.

In some embodiments, a separate processing subsystem 110 may exist for each object 190. For instance, if each object 190 is a port or queue, a separate hardware component or set of processes may be configured to process messages from each separate port or queue. A processing subsystem 110 may even be to some extent synonymous with the corresponding object 190, as may occur if each object 190 is a system thread. In other embodiments, there is not necessarily any correlation between the number of objects 190 and the number of processing subsystems 110.

Objects 190 may be assigned resources 120 for the purposes of one or more processing subsystems 110. Moreover, the resources 120 are unassigned and/or reassigned over time, as needed by the one or more processing subsystems 110. The exact mechanism of resource assignment may vary depending on the embodiment, though examples are given in other sections of this application. In any event, as a result of the resource assignment, system 100 includes resource assignment data 115. This resource assignment data 115 maps objects 190 to resources 125. Although the resource assignment data 115 may, in certain embodiments, contain a complete mapping of resources 125 to objects 190, in other embodiments, resource assignment data 115 need not include a complete mapping. For instance, the resource assignment data 115 may simply be a series of messages between a processing subsystem 110 and counting subsystem 180 logging changes in resource assignments, and these messages may not necessarily be permanently stored once processed by the counting subsystem 180.

In an embodiment, resources 125 may be assigned to more than one object 190 simultaneously. For example, a resource 125 may be assigned to both one of objects 190a and one of objects 190b. For instance, buffer resources consumed by a packet arriving on an ingress port may be assigned to the ingress port. Simultaneously, buffer resources consumed for the same packet departing from a given egress port may be assigned to the egress port. Thus a given buffer resource may be assigned to both objects (i.e. the ingress port and the egress port). This enables two concurrent views of buffer resource usage, with one view based on the source port and the other view based on the destination port.

In an embodiment, objects 190 include different sets of objects. For instance, there may be one set of objects 190a for one type of object, another set of objects 190b for another type of object, and so forth. In some embodiments, a resource 125 is only assigned to one object from a given set at a given time. In other embodiments, there is no limit to the number of objects 190 in a set to which a resource 125 may be assigned.

2.3. Counting Subsystem

Aggregate-Level Counters

System 100 further comprises a counting subsystem 180. Counting subsystem 180 tracks the utilization of resources 125 for objects 190 in resource utilization data 160. Resource utilization data 160 comprises, among other elements, various aggregate-level counters 162. An aggregate-level counter 162 indicates a total measure of resources 125 utilized for a particular one of objects 190. For instance, each aggregate-level counter 162 may indicate a count of a number or amount of resources 125 currently assigned to the object 190 that is associated with the aggregate-level counter 162. Aggregate-level counters 162 may exist for all objects 190, or for a subset of objects 190, such as for objects 190a. For example, aggregate-level counters 162 may exist for all objects of a certain type, or for certain objects that have been flagged as significant for reporting purposes.

Counting subsystem 180 may maintain and update the aggregate-level counters 162 using a variety of counting mechanisms, based on resource assignment data 115. For instance, counting subsystem 180 may increment or decrement the aggregate-level counter 162 for an object 190 whenever it receives a message 115 that a resource 125 has been assigned or unassigned to the object 190. Counting subsystem 180 may instead periodically analyze resource assignment data 115 to count resource assignments and unassignments, either for a given period (if resource assignment data 115 is incremental) or as a whole (if resource assignment data 115 includes a complete mapping of resources 125 to objects 190).

As another example, counting subsystem 180 may increment or decrement the aggregate-level counter 162 for an object 190 whenever it receives an indication that a certain "resource assignment event" has occurred, such as receiving and/or disposing of a cell, packet, or other message within a network device. Such events may serve as proxy indicators of resource assignments—that is, a resource may not yet have actually been assigned in response to the event, but it is assumed that a resource will be assigned, if allowed at that time, or that a corresponding disposal event will occur relatively quickly if resource assignment is not allowed at that time.

Figure 4:
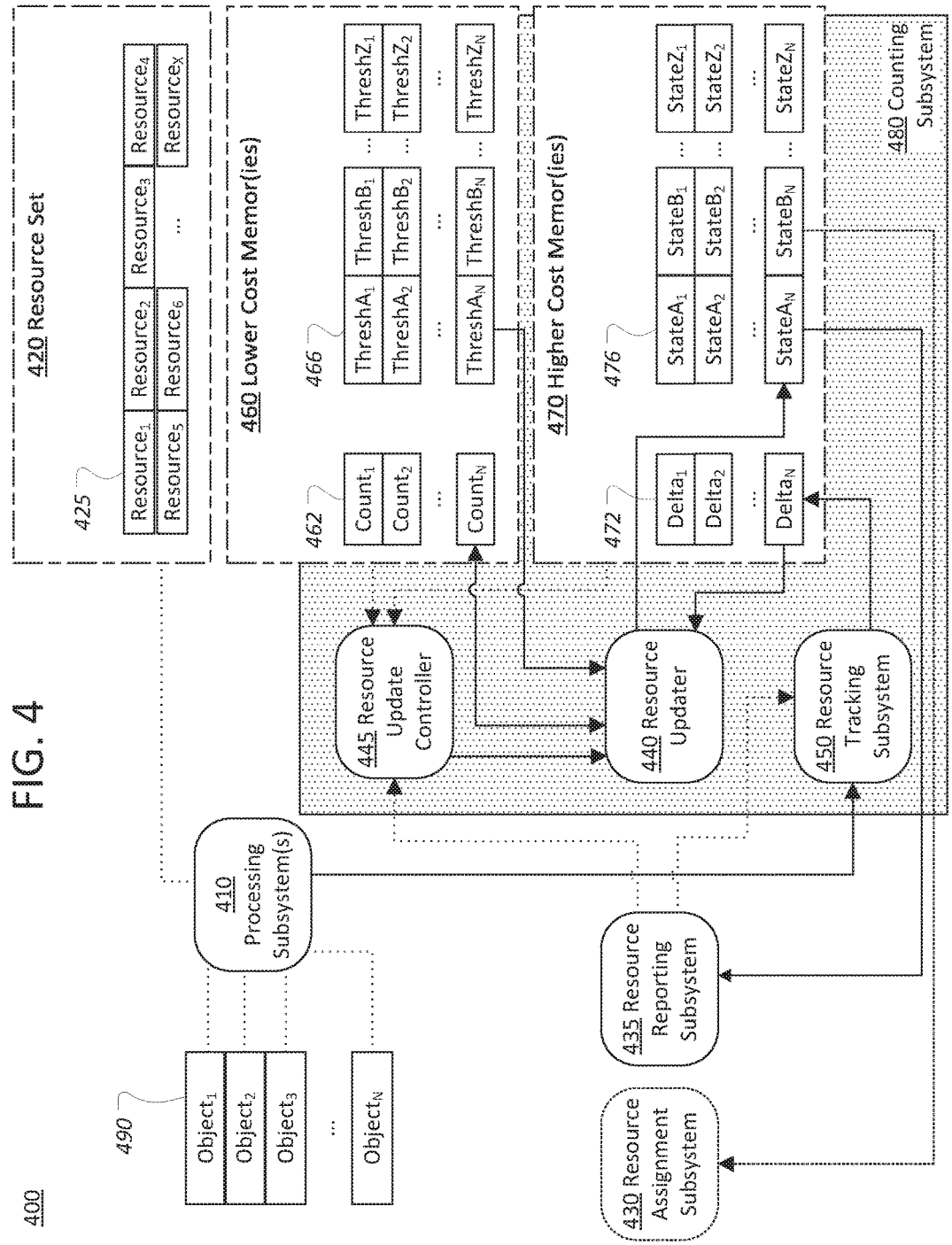
FIG. 4 illustrates an example system in which the described efficient counting techniques may be practiced.

In an embodiment, counting subsystem 180 may utilize a bifurcated counting process such as described with respect to counting subsystem 480 of FIG. 4, in which case aggregate-level counters 162 may be full counters 462.

Depending on the embodiment, aggregate-level counters 162 may or may not accurately reflect the number or amount of resources currently assigned to an object 190. For instance, the aggregate-level counters 162 may provide approximate counts on account of sampling techniques or delayed counting techniques. In some embodiments, the count may be accurate as of a last sample time for the object 190. However, the aggregate-level counter 162 for an object 190 is not necessarily updated each time a new resource 125 is allocated to the object 190. Hence, at any given time, the aggregate-level counter 162 is not necessarily an accurate count of the number of resources 125 assigned to the object 190 at that given time. The aggregate-level counter 162 may thus be characterized as indicating an "approximate," "delayed," or "fuzzy" count of the number of resources 125 assigned to the object 190.

Granular-Level Counters

Resource utilization data 160 may further comprise granular-level counters 163. Granular-level counters 163 correspond to combinations of objects 190. That is, granular-level counters 163 provide counts of resources assigned to two or more specific objects at the same time. Each granular-level counter 163 measures the total number of resources assigned to all of the objects 190 in a different combination of objects 190. Thus, the three depicted granular-level counters 163a count the number of resources assigned to each of the combinations (Object1, ObjectA), (Object2, ObjectA), and (Object3, ObjectA), respectively.

For instance, a single message buffer in a network device may be concurrently assigned to an inbound port, destination point, service class, and/or any number of other different objects. A granular-level counter 163 may exist for some or all possible combination of these objects (e.g. buffers assigned to handle messages from inbound port 1 that are destined for outbound port A, messages destined for outbound port B with a service class 10, and so forth).

From one perspective, whereas an aggregate-level counter 162 tracks resource utilization for a particular object in aggregate, the granular-level counters 163 for that particular object count resource utilization for that particular object at a granular level. The granular-level counters 163 "for" the particular object may be the set of all granular-level counters 163 that correspond to any combination of objects that includes the particular object. Each other object with which the particular object is paired through these combinations is considered to correspond to a category or class of resource utilization for that particular object. Each of the granular-level counters 163 for the particular object thus indicates how much of the aggregate resource utilization for the particular object can be attributed to each category or class of resource utilization.

In some embodiments, granular-level counters 163 may be kept for each possible combination of objects. In other embodiments, combinations may be limited to certain dimensionalities. For instance, granular-level counters 163 may only be kept for each possible pair of objects. In yet other embodiments, combinations may be limited based on types, categorizations, or user designations. For example, an object of one type may only be combined an object of another type, and/or granular-level counters may be kept only for objects of a certain type. In some embodiments, each resource must be assigned to at least one object in each of two or more distinct sets of objects, and hence combinations exist for each possible combination of an object from one of the sets with an object in another one of the sets.

According to an embodiment, granular-level counters 163 are only kept for certain priority objects. Each aggregate-level counter 162 may have a priority status indicator 175, which indicates a priority-level for the object corresponding to the aggregate-level counter 162. The priority level may be a simple binary bit indicating whether or not the object is prioritized. Or, more complicated priority levels may exist, associated with various prioritization rules. In either case, for objects 190 having at least a certain priority level (i.e. "priority objects"), granular level counters 163 may be instantiated within the resource utilization data 160, and counting subsystem 180 may then be configured to update these granular-level counters 163 accordingly.

Since the priority level of an object 190 may change (including, without limitation, changes as a result of techniques described herein), the existence of granular-level counters 163 within the resource utilization data 160 may be temporary, as indicated within FIG. 1 by the use of dotted outlines for the granular-level counters 163. Granular-level counters 163 for objects that are no longer priority objects may be deleted to make room for other granular-level counters 163, thus reducing the memory costs associated with maintaining the granular-level counters 163. That is, since not all objects 190 are considered priority objects, resource utilization data 160 need not store granular-level counters 163 for each object 190 being tracked with aggregate-level counters 162.

For instance, supposing that the priority status indicator 175 for Object1 indicated that Object1 had become a priority object, counting subsystem 180 may allocate granular level counters 163 within resource utilization data 160 for various combinations of Object1 with objects 190b, thus producing the illustrated Count1A, Count1B, and Count1C. Henceforth, when a resource 125 is assigned or unassigned to Object1, counting subsystem 180 may determine whether the resource 125 is also assigned to one of the objects 190b, and if so, update, the appropriate granular level counter 163. Counting subsystem 180 would do so in addition to updating the appropriate aggregate-level counter(s) 162. When the priority status indicator 175 for Object1 indicated that Object1 was no longer a priority object, counting subsystem 180 may deallocate the granular level counters 163 for Object1.

Depending on the embodiment, as a result of allocating granular-level counters 163 on demand, granular-level counters 163 may only reflect the change in resource utilization for the particular object since the particular object became a priority object. Thus, granular-level counters 163 reflect a resource utilization trend rather than a complete measure of resource utilization. In other embodiments, the complete measure may be reconstructed through a retroactive analysis of logged resource assignments (e.g. via analyzing resource assignment data 115).

In yet other embodiments, the memory costs associated with maintaining the granular-level counters 163 is not considered to be significant, and thus granular-level counters 163 are kept persistently for all desired combinations of objects, without regard to the priority status indicators 175. In such embodiments, the priority status indicators 175 may still be utilized for other purposes related to the granular-level counters 163, such as determining whether to maintain a status indicator 177 for a given combination of objects, changing the update frequency or counting mechanisms used for the granular-level counters 163, or reducing network utilization for sending reports comprising granular-level counters 163, as described in other sections.

Counting subsystem 180 may utilize the same counting mechanism to update granular-level counters 163 as it uses to update aggregate-level counters 162, or counting subsystem 180 may utilize a different mechanism. For instance, in one embodiment both granular-level counters 163 and aggregate-level counters 162 are updated using the bifurcated counting mechanism described herein. In an embodiment, granular-level counters 163 are updated using the bifurcated tracking mechanism, while aggregate-level counters 162 are updated, when possible, by summing the granular-level counters 163. In yet other embodiments, aggregate-level counters 162 are updated using the bifurcated counting mechanism, while granular-level counters 163 are updated in real-time, or through a sampling process that selectively updates the granular-level counters 163 for some resource assignments but not for others (e.g. every X resource assignments).

In an embodiment, as explained above, the counting technique and/or update frequency used for a set of granular-level counters 163 may vary depending on the priority level of a corresponding object. For instance, granular-level counters 163 for objects with a high priority level may be updated or sampled more frequently than those with a low priority level. Or, a real-time counting technique may be used for the granular-level counters 163 of high priority objects, while low priority objects may be updated on a delayed basis.

2.4. Status Updater

System 100 further comprises a status updater 140 configured to update status indicators in resource utilization data 160, such as priority status indicators 175, aggregate-level status indicators 175, and/or granular-level status indicators 177. Status updater 140 may use counters 162 to determine aggregate-level status information 175 and 176 for each object 190 having a counter 162.

The determined status information indicates at least one state for each object 190. That is to say, the status of each object 190 is characterized with respect to one or more defined states. For instance, the status indicators 176 may describe the state of each object 190 with respect to a congested state, warning state, critical state, and so forth. An object may have any number of state indicators, indicating any number of states. In an embodiment, each state indicator 176 may be a binary bit, indicating whether or not the object 190 is in a state corresponding to the state indicator 176. In another embodiment, each state indicator 176 may be more than one bit, allowing for more complex states, or indicating that the object 190 is in a specifically enumerated state in a set of mutually exclusive states.

For each state, one or more thresholds are defined. The status updater 140 determines whether the object is in the state using these one or more thresholds. For instance, a threshold may be a value against which a counter 162 is compared. If the counter 162 is above (or, in some embodiments, equal to) the threshold, the object 190 corresponding to the counter 162 is said to be in the state associated with the threshold. As another example, thresholds may define one or more ranges, lists, or sets of values associated with different states.

In an embodiment, thresholds may be different for different objects 190. For instance, in the context of managing per-port message buffers in a network device, different thresholds may be assigned to different outgoing ports. That is, one port may be allowed to use more buffers than another port. Or reporting may be triggered for one port sooner than for another port.

Status updater 140 may also use counters 163 to update granular-level status information 177 for each combination of objects having a counter 163. Again, status updater 140 may compare counters 163 to global, object-specific, or combination-specific thresholds to identify status information 177, and this status information 177 may include more than one indicator for more than one state.

However, not all embodiments store granular-level status information 177. For instance, granular-level status information 177 may only be determined when needed for reporting, and thus is not persistently updated and stored. Or, granular-level counters 163 may be reported directly, removing the need for storing intermediate granular-level status information 177. Likewise, in certain embodiments, the aggregate-level status information 175/176 is determined as needed rather than stored persistently.

Various rules may be associated with the states. For instance, as already described, various rules that govern the counting subsystem 180 and/or the reporting subsystem 135 may be applied based on a priority level indicated by priority status indicator 175. As another example, if an object 190 is said to be in certain state (e.g. a "warning" state), a notification subsystem may generate and send a notification message. Or, if an object 190 is said to be in a certain state, resource assignment subsystem 130 may be configured to throttle or altogether stop allocating new resources 125 for the object 190.

Depending on the embodiment, rules and states may be pre-configured by one or both of a manufacturer or network administrator. Thresholds may likewise be established. Or, in an embodiment, another subsystem may be configured to periodically evaluate and adjust thresholds based on any of a variety of factors, such as historical usage trends or predicted operating needs. For non-binary states, thresholds need not be set at even intervals, but rather may be logarithmic, irregular, and so forth, depending on the embodiment.

Note that the priority status indicator 175 is, in one sense, an example of a status indicator 176 that has a special meaning within the context of the reporting techniques described herein. That is, priority status indicator 176 indicates a reporting priority level to assign to an object 190. The priority level may be determined, for example, by thresholds chosen to indicate when the associated object 190 is considered to be "congested" or over-utilizing resources 125. The priority-level may double as a status that should be reported. For instance, four congestion levels may be defined for reporting purposes, corresponding to four different thresholds. The highest two congestion levels may also correspond to a high priority level. Thus, the congestion level is in effect both a general status indicator 176 and a priority status indicator 175.

Status updater 140 may, in some embodiments, operate asynchronously to the tracking steps performed by counting subsystem 180. For instance, status updater 140 may be implemented by entirely separate processing threads and/or hardware than counting subsystem 180, but still share access to the same memory or memories used to store resource utilization data 160. Status updates may be performed periodically or on some other scheduled basis, without regard to the functioning of counting subsystem 180. Or, status updater 140 may be integrated partially or fully within counting subsystem 180, and perform some or all of the status updates at the same time counting subsystem 180 updates a counter 162 or 163.

According to an embodiment, some status indicators 175/176/177 are updated more frequently than others. For instance, aggregate-level status indicators 176 may be updated more frequently than granular-level status indicators 177, or vice versa. Or, certain granular-level status indicators 177 may be updated more frequently than other granular-level status indicators 177. For instance, granular-level status indicators 177 for high-priority objects, as indicated by priority status indicators 175, may be updated more frequently than those for low-priority objects. A variety of scheduling or other suitable algorithms may be configured to this end, including those described in other sections. In an embodiment, status indicators 175/176/177 are status indicators 476.

In certain embodiments, low-priority status indicators may not be updated at all. In fact, in some embodiments, granular-level status indicators 177 are not even stored for low-priority objects, even if granular-level counters 163 are stored for those objects. That is, just like the granular-level counters 163, granular-level status indicators 177 may be allocated or deallocated dynamically based on the current priority level for the corresponding object 190.

2.5. Reporting Subsystem

System 100 further comprises resource reporting subsystem 135, configured to report information from resource utilization data 160. Resource reporting subsystem 135 may report this information in a variety of ways, depending on the embodiment. In one embodiment, resource reporting subsystem 135 is coupled directly to display logic for displaying a table, graph, or other presentation of resource utilization data 160. In another embodiment, resource reporting subsystem 135 is configured to send one or more messages with the reported information to one or more receivers, that are in turn configured to utilize the information for display purposes and/or decision-making. These receivers may include local receivers, such as processors, FPGAs, and so forth, and/or network-based receivers, such as a logically centralized monitoring device or application, or decentralized collection points distributed over a network.

Different types and amounts of information may be reported depending on the embodiment and/or on the priority levels assigned to the objects 190. In an embodiment, some or all status indicators 175/176/177 are reported. In other embodiments, the reported information may also or instead include counters 162 and/or counters 163. In an embodiment, resource reporting subsystem 135 may determine whether to report granular counters 163 or status indicators 177 based on the priority levels assigned to their corresponding objects 190. Or, such a determination may not be necessary on account of counting subsystem 180 only allocating granular counters 163 or status indicators 177 for priority objects. In yet other embodiments, granular counters 163 or status indicators 177 are reported indiscriminately. Aggregate-level status indicators 175/176 or counters 162 may also be reported, in certain embodiments.

The frequency of reporting may also differ depending on the priority level of an object. For instance, resource reporting subsystem 135 may report granular-level status information 177 for higher priority objects at more frequent intervals than status information 175/176/177 for lower priority objects. In an embodiment, some or all status indicators 175-177 are only reported when they change (i.e. in response to changing, or in response to detecting that they have changed since a previous reporting period). In other embodiments, status indicators 175-177 are reported only if they have a value deemed to be significant. For instance, a status value of 0 might not be reported, under the assumption that any object for which no report information is received has the same status value.

In some embodiments, resource reporting subsystem 135 operates asynchronously relative to counting subsystem 180 and/or status updater 140. For instance, reports may be scheduled on a periodic basis or according to some priority-based schedule. In other embodiments, resource reporting subsystem 135 works in conjunction with counting subsystem 180 and/or status updater 140. For instance, status updater 140 may request that resource reporting subsystem 135 send a new report message any time it updates status information that should be reported.

As explained in previous sections, in some embodiments, granular-level counters 163 and/or status information 177 may not always be tracked for certain of objects 190, such as for low priority objects. However, a user may still wish to have some granular-level information depicted for those low priority objects. In such cases, a number of options are available for presenting placeholder values that effectively communicate that the objects are of low priority or interest to the user. For instance, granular-level counters 163 or status information 177 for low priority objects may be reported as having default values, such as 0.

As another example, granular-level counters 163 or status information 177 may be estimated for low priority objects, based on the aggregate-level counter 162 or status information 175/176 for the low priority objects. For instance, if counters are being reported, the aggregate-level counter 162 may be divided by the total number of granular-level counters 163 expected for the low priority object to produce an average value, which may be reported for each granular-level counter 163 of the object. Or, if status information is being reported, the aggregate status indicator 175/176 of the object may be reported as the value of each granular-level status indicator 177 for the object. In some embodiments, the estimate may also or instead be a function of other information, such as the last known value of a specific granular-level counter 163, or a historical trend.

As also explained above, in some embodiments, resource reporting subsystem 135 reports information to other receivers. Rather than send an estimate or default value for the granular-level information of low priority objects, the resource reporting subsystem 135 may, in an embodiment, send no information for the low priority objects, or only aggregate-level information for the low priority objects. It is then up to the receiver to produce default values or estimates for the low priority objects, using techniques such as described above.

2.6. Example Report (2D Heat Map)

In an embodiment, the reported resource utilization data is displayed in a two-dimensional heat map whose cells correspond to various pairings of objects from two different sets of objects 190. Each axis of the heat map may correspond to a different group of objects. Coloring, shading, or other appearance aspects of each cell may vary depending on the granular-level count or status information reported for that cell. A count or status label may also be displayed within each cell. In some embodiments, such a heat map may be produced without necessarily storing and/or transmitting status information for each cell within the heat map.

Figure 2:
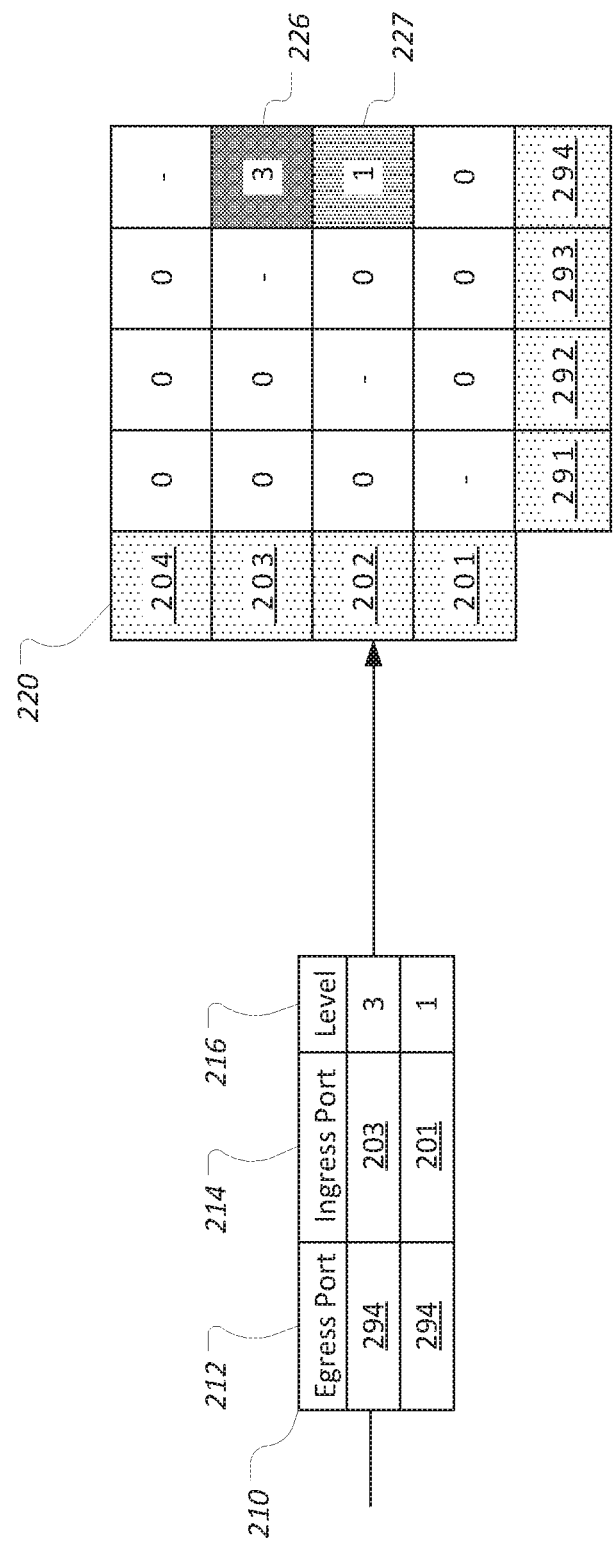
FIG. 2 illustrates a heat map generated based on status information reported for a first set of objects.

For instance, FIG. 2 illustrates a heat map 220 generated based on status information 210 reported for a first set of objects 212, corresponding to egress ports 201-204, and a second set of objects 214, corresponding to ingress ports 291-294 (which physically may be the same as egress ports 201-204). Status information 220 includes congestion levels 216 for certain pairings of egress ports 212 and ingress ports 214. These congestion levels 216 are an example of granular-level status information 177 than may be sent by resource reporting subsystem 135, and are reflected in the heat map 220 as cells 226 and 227.

As depicted, only one object 212 has been identified as having a high priority—egress port 294. Of the granular-level status information relevant to egress port 294, significant values have been identified for only two of ingress ports 214. Hence, status information 210 only reports levels 216 for egress port 294 relative to these two ingress ports, 203 and 201. Optionally, status information for the remaining pairings of objects 212 and 214 may be extrapolated, estimated, or set to default values, depending on the embodiment. Thus, heat map 220 includes cells corresponding to status information not reported in status information 210, each of which has a default placeholder value of 0. Meanwhile, cells 226 and 227 may be said to correspond to "hot spots" in the heat map—i.e. those cells having granular-level status information above a threshold or outside of a normal range.

FIG. 2 illustrates but one example technique for reporting and depicting status information. Other techniques may report more or fewer combinations of objects having varying degrees of dimensionality. Other techniques may further use different data visualization or reporting techniques, such as, without limitation, a table, bubble graph, or hierarchy of charts that a user may drill-down into. In an embodiment, one-dimensional reporting techniques may also or instead be utilized, such as a one-dimensional heat map based only on destination ports.

2.7. Network-Based Reporting System

Figure 3:
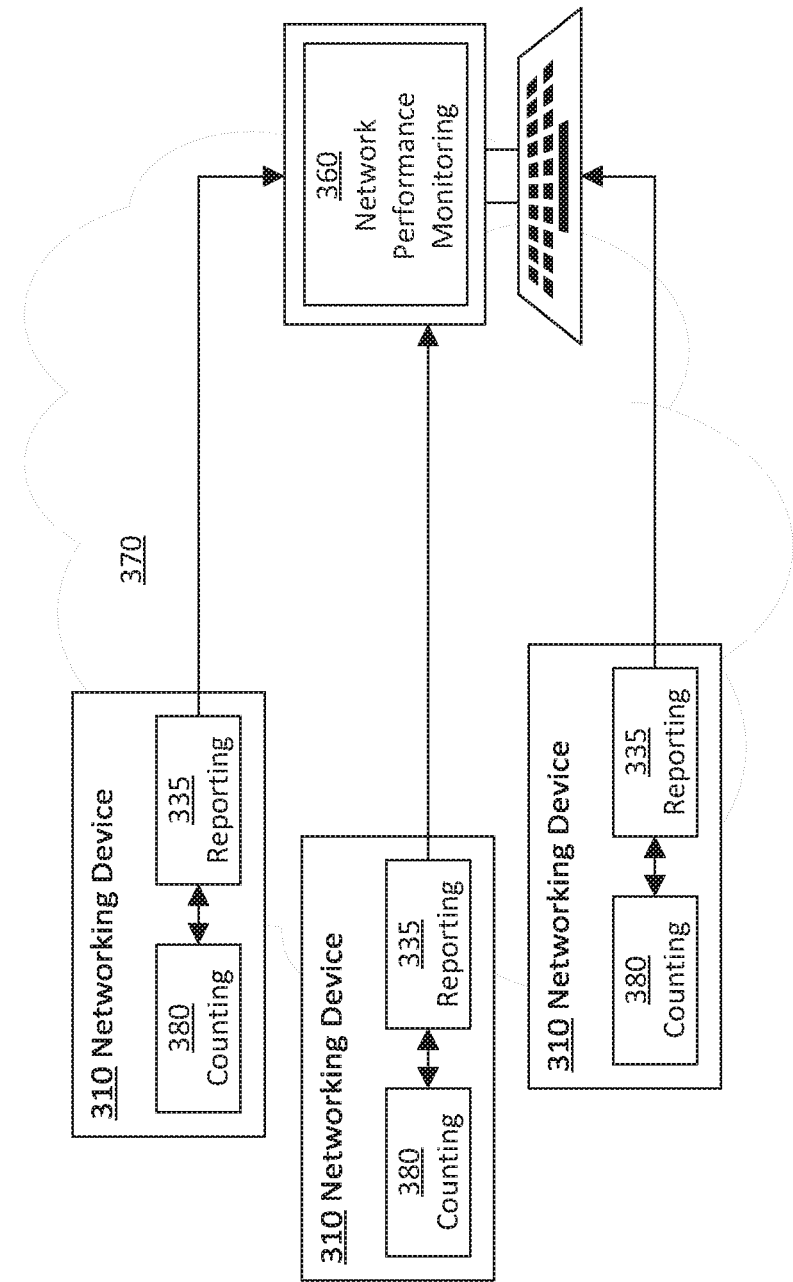
FIG. 3 illustrates an example network-based system in which the described techniques may be practiced.

According to an embodiment, the described techniques may be utilized in a system of devices configured to report status information over a network. For example, FIG. 3 illustrates an example network-based system 300 in which the described techniques may be practiced, according to an embodiment. System 300 comprises a plurality of devices 310 connected via one or more networks 370 to a network performance monitoring device 360. For instance, devices 310 may be routers, switches, or other network infrastructure appliances in a server farm or on an intranet, and network performance monitoring device 360 may monitor the performance of these devices. Of course, devices 310 may be any sort of device, and network(s) 370 may be any combination of network types.

Devices 310 are configured to implement a reporting system using techniques described herein. For instance, each device 310 may include hardware that implements system 100. Among other components, each device 310 includes a counting component 380, such as counting subsystem 180, and a reporting component 335, such as reporting subsystem 135. Counting component 380 tracks resource utilization within the networking device 310, while reporting component 335 reports information gathered by the counting component 380 to the network performance monitoring device 360 by sending one or more report messages over the one or more networks 370.

Network performance monitoring device 360 is a centralized device, such as a router, gateway, or domain controller, configured to receive report information from each reporting component 335. With the report information, the network performance monitoring device 360 is configured to perform one or more of: displaying graph or table-based reports of resource utilization statistics from individual devices 310 in real-time (e.g. displaying a heat map in a web-based administrative interface or on a connected monitor), store historical resource utilization statistics for analysis and/or visualization, send notifications based on various threshold-based rules, or automatically reconfigure routes within network(s) 370 and/or settings within devices 310 based on rules applied to the reported information.

In an embodiments, system 300 may optionally include a plurality of distributed collection points within the one or more networks 370, to scale to monitoring of a large number of devices 310. The collection points are application implemented on devices strategically deployed across the one or more networks 370 to load-balance the handling of reports from the devices 310. The collection points may aggregate and forward reports on to the network performance monitoring device 360. The collection points may also or instead provide local handling of the data they collect, in similar manner to network performance monitoring device 360.

However, in other embodiments, a network of devices is not required. Rather, each device 310 may implement its own logic equivalent to that of network performance monitoring device 360, which is applied exclusively to resource utilization information produced by that device 310.

2.8. Example Counting Subsystem

According to some embodiments, the reporting techniques described herein may be utilized in conjunction with efficient counting techniques that leverage counters in multiple types of memories. Such counting techniques may be used wholly for reporting resource utilization as described above, or in conjunction with other processes, such as a resource assignment mechanism.

FIG. 4 illustrates an example system 400 in which the described efficient counting techniques may be practiced, according to an embodiment. System 400 comprises many features that are similar to system 100, and in fact system 400 may be an alternative view of system 100. However, in other embodiments, system 400 may be an entirely different system than system 100.

System 400 comprises objects 490, resources set 420, resources 425, processing subsystem(s) 410, and resource reporting subsystem 435, which are similar to objects 190, resource set 120, resources 125, processing subsystem(s) 110, and resource reporting subsystem 135, respectively. System 400 further comprises a counting subsystem 480, which is an example of counting subsystem 180. Although no single component equivalent to status updater 140 is depicted, the functions of status updater 140 may be distributed amongst the various subcomponents of counting subsystem 480. Meanwhile, resource utilization data 160 may be spread across memories 460 and 470. For example, full counters 462 may be used to store counters 162 and/or 163, while status information 476 may be used to store status information 175, 176, and/or 177, depending on the embodiment.

Full Counters

Full status counters 462 may include one or more full counters 462 for each object 490. Each full counter 462 indicates a count of a number or amount of resources 425 currently assigned to the object 490 that is associated with full counter 462. The count may be accurate as of a last sample time for the object 490. However, the full counter 462 for an object 490 is not necessarily updated each time a new resource 425 is allocated to the object 490. Hence, at any given time, the full counter 462 is not necessarily an accurate count of the number of resources 425 assigned to the object 490 at that given time. The full counter 462 may thus be characterized as indicating an "approximate," "delayed," or "fuzzy" count of the number of resources 425 assigned to the object 490.

Object Status Information

Full counters 462 are used to determine status information for each object 490 with respect the allocation of resources 425 in resource set 420. In an embodiment, resource assignment subsystem 430 may be configured to determine the status information based on comparing the full counters 462 to thresholds 466. In other embodiments, the status information is determined by another subsystem, such as resource update controller 440, and then stored as state indicators 476.

In any case, the determined status information includes at least one state for each object 490. That is to say, the status of each object 490 is characterized with respect to one or more defined states. For instance, the depicted state indicators 476 describe the state of each object 490 with respect to a StateA, StateB, StateZ, and so forth. In an embodiment, each state indicator 476 may be a binary bit, indicating whether or not the object 490 is in a state corresponding to the state indicator 476. In another embodiment, each state indicator 476 may be more than one bit, allowing for more complex states, or indicating that the object 490 is a specifically enumerated state in a set of mutually exclusive states.

For each state, one or more thresholds 466 are defined. For instance, a threshold 466 may be a value against which a full counter 462 is compared. If the full counter 462 is above (or, in some embodiments, equal) to the threshold 466, the object 490 corresponding to the full counter 462 is said to be in the state associated with the threshold 466. As another example, thresholds 466 may define one or more ranges, lists, or sets of values associated with different states.

Various rules may be associated with the states. For instance, if an object 490 is said to be in a certain state, resource assignment subsystem 430 may be configured to throttle or altogether stop allocating new resources 425 for the object 490. Or, if an object 490 is said to be in another state, a notification subsystem may generate and send a notification message. Depending on the embodiment, rules and states may be pre-configured by one or both of a manufacturer or network administrator. Thresholds 466 may likewise be established. Or, in an embodiment 466, another subsystem may be configured to periodically evaluate and adjust thresholds 466 based on any of a variety of factors, such as historical usage trends or predicted operating needs.

In an embodiment, thresholds 466 may be different for different objects 490. For instance, in the context of managing per-port message buffers in a network device, different thresholds may be assigned to different outgoing ports. That is, one port may be allowed to use more buffers than another port. Or notifications may be triggered for one port sooner than for another port.

Resource Tracking

Counting subsystem 480 comprises one or more resource tracking subsystems 450. A resource tracking subsystem 450 (also referred to as a counting subsystem) is a set of one or more hardware components and/or software processes configured to update intermediate counters 472 responsive to countable events, such as resource assignments or events that require resource assignments. While full counters 462 and state information 476 may not always accurately reflect the number of resources 425 currently assigned to an object 490, it is still necessary to track resource assignments. Thus, whenever resource assignment subsystem 430 assigns a new resource 425 to an object 490, or unassigns a resource 425 from an object 490, a resource tracking subsystem 450 updates an intermediate counter 472 for the object 490. Each intermediate counter 472 indicates the net change in resources assigned to its corresponding object 490 since the last sample time for the full counter 462 of the object 490 (i.e. when the full counter 462 of the object 490 was last updated).

For instance, each time a resource 425 is assigned for a specific object 490, the resource tracking subsystem may increment the intermediate counter 472 for the object 490 by one unit Likewise, each time a resource 425 is unassigned for a specific object 490, the resource tracking subsystem may decrement the intermediate counter 472 for the object 490 by one unit. In embodiments where resources 425 are of different sizes (e.g. different memory sizes, unit sizes, etc.), the intermediate counter 425 may instead be incremented and decremented by an amount corresponding to the size of the assigned resource 425.

Resource Status Updates

Counting subsystem 480 further comprises one or more resource updaters 440 (also referred to as a status updater). A resource updater 440 is a set of one or more hardware components and/or software processes configured to update the full counters 462 based on the intermediate counters 472. More specifically, resource updater 440 updates a given full counter 462 by adding (or subtracting) the current value of the corresponding intermediate counter 472 to (or from) the full counter 462. The intermediate counter 472 is then reset to a value of zero.

In an embodiment, resource updater 440 is also configured to update state indicators 476. For instance, upon updating a full counter 462 for an object 490, resource updater 440 may also update the one or more state indicators 476 for the object 490 by comparing the new value of the full counter 490 to the appropriate threshold(s) 466.

The time at which resource updater 440 updates a given full counter 462 is referred to herein as the sample time or update time for the full counter 462 and its corresponding object 490. In an embodiment, counting subsystem 480 comprises one or more resource update controllers 445. A resource update controller 445 is a set of one or more hardware components and/or software processes configured to control the timing of or schedule these update times by instructing a resource updater 440 to perform updates for the counters of specific objects 490 selected by the resource update controller 445 through various selection algorithms. Though depicted as a component that is separate from resource updater 440, it will be recognized that resource update controller 445 may also be integrated into the resource updater 440.

Generally, resource update controller 445 is configured to control update times in such a manner that updates to the full counters 462 occur less frequently than updates to the intermediate counters 472. In an embodiment, the updating of the full counters 462 may further be performed asynchronously relative to resource assignments and the events that trigger the resource assignments. That is, unlike the updating of intermediate counters 472, the updates to the full counters 462 occur on a schedule that is independent from and not responsive to resource assignments.

Resource update controller 445 may be configured to select specific objects to update at specific times in a variety of manners. For instance, resource update controller 440 may simply update the full counters 462 on a periodic basis. Or, resource update controller 440 may iteratively cycle through the full counters 462 and update them accordingly. In an embodiment, resource update controller 445 may select a certain number of full counters 462 to update each clock cycle (or each set of clock cycles). The specific full counters 462 updated during a given set of clock cycles may be chosen in a variety of manners, such as sequentially, randomly, based on a prioritization scheme, etc. In at least some embodiments, resource update controller 445 may have access to full counters 462, intermediate counters 472, thresholds 466, state information 476, or other information in memories 460 or 470, based upon which resource update controller 445 may make at least some determinations of which objects 490 to select for update at a given time. In an embodiment, resource update controller 445 schedules updates to full counters 462 only during downtimes, or in response to events such as detecting that the value of an intermediate counter 472 has surpassed some threshold. In an embodiment, resource update controller 445 varies the frequency with which full counters 462 are updated based on factors such as the foregoing.

In an embodiment, the full counters 462 for certain objects 490 may be updated whenever a new resource assignment occurs, while other full counters 462 may be updated in accordance to a schedule such as described herein. Various other examples of techniques for controlling or scheduling updates of the full counters 462 are described in subsequent sections.

Memories

According to an embodiment, full status counters 462 are stored in a first memory area 460 of relatively low cost, while intermediate counters 472 are stored in a second memory area 470 of higher cost but that supports a faster access rate. Thresholds 466 may also be stored in the first memory area 460, or another memory area of relatively low cost, while status indicators 476 may be stored in the second memory area 470 or another memory area of relatively high cost and faster access rate. For instance, the first memory area may be a single-ported memory, Dynamic Random Access Memory ("DRAM"), solid state storage device, and/or other relatively slow memory. By contrast, the second memory area may be a set of registers, multi-ported memory, DRAM, and/or other relatively fast memory.

This configuration leverages higher access rate of the second memory 470 to improve the efficiency of system 400 relative to simply using the first memory 460 to store counters and status information. Of course, a simpler approach to leverage the higher access rate of the second memory 470 would be to simply store all full counters 462 and thresholds 466 in the second memory 470, and to update the full counters 462 directly every time they change. However, the storage requirements for the full counters 462 and thresholds within the second memory 470 may be undesirably large. On the other hand, assuming sample times occur frequently enough, the storage requirements for each intermediate counter 472 may be much smaller than the number of bits required to store a full counter 462. Similarly, the storage requirements for a status indicator 476 may be much less than the storage requirements for a threshold 466. Hence, a much smaller amount of memory 470 is needed to take advantage of the higher access rates afforded by memory 470 using the described techniques.

In an embodiment, the maximum possible value of each intermediate counter is a function of the update strategy used by the resource update controller 440. Hence, the size of each intermediate counter 472 in the second memory 470 can be selected to be no bigger than necessary to store the maximum possible value of that intermediate counter 472. In an embodiment, the algorithm(s) utilized by resource update controller 445 may be such that certain objects 490 are guaranteed to be updated more frequently. Since certain objects 490 are guaranteed to be updated more frequently, the intermediate counters may accordingly be of varying sizes.

Moreover, in accordance with certain described techniques, the number of accesses to the full counters 462 and thresholds 466 can be greatly reduced to mitigate the impact of using the slower first memory 460 to store the full counters 462 and thresholds 466. While the intermediate counters 472 and status indicators 476 may be accessed any time a resource is assigned, which may be quite frequently, the full counters 462 and thresholds 466 may not actually need to be accessed at times other than their respective sample times. Thus the one or more memories 460 need not support the same high access rates as the intermediate counters 472 and status indicators 476.

On the other hand, not all embodiments require that counters 462 and 472 be stored in separate memories in order to realize certain advantages of the described techniques.

According to an embodiment, for convenience and potential reduction in read/write times, the threshold(s) for an object may be stored in close proximity to the full counter for the object (e.g. in a same record, in a same addressable unit of memory, in consecutive units of memory, etc.). Similarly, status information for an object may be stored in close proximity to the intermediate counter for the object.

According to an embodiment, full counters and thresholds are stored in single-ported memories, which allow for higher frequency clock cycles. However, other embodiments need not necessarily share this configuration.

Resource Assignment

According to an embodiment, the same counting mechanism used for reporting may also be used for various resource assignment purposes. Prior to utilizing a resource 425 in association with a given object 490, a processing subsystem 410 is configured to ensure that the resource 425 is assigned or allocated for use with the given object 490. To this end, system 400 comprises one or more resource assignment subsystems 430. A resource assignment subsystem 430 is a set of one or more hardware components and/or software processes configured to implement any suitable conflict resolution mechanism(s) to manage the assignment of specific resources 425 to specific objects 490. A processing subsystem 410 may, for instance, identify a specific object 490 for which a resource 425 is needed and request that the resources assignment subsystem 430 assign one or more resources 425 for use with respect to that specific object 490. In response, resource assignment subsystem 430 locates an available resource 425, if possible, and identifies the location of that resource to the processing subsystem 410.

When the processing subsystem 410 is done using the identified resource 425 for the specific object 490, resource assignment subsystem may then unassign or deallocate the identified resource 425 from the specific object 490. This deallocation process may occur, for example, responsive to an explicit request from processing subsystem 410, or responsive to yet another process or subsystem that identifies resources 425 that are no longer being used for a specific object 490 using garbage collection or other suitable techniques.

For instance, within the context of managing per-port or per-queue message buffers in a networking device, a resource assignment subsystem 430 may allocate or assign message buffers to routable messages as the routable messages arrive and/or are placed in a certain queue. The resource assignment subsystem 430 may unassign message buffers as the messages are disposed of, such as when the routable messages are routed to their next destination device, processed, passed off to a next processing component, discarded, and so forth.

For illustrative purposes, processing subsystem(s) 410 are depicted as conceptually separate from resource assignment subsystem 430. However, in some embodiments resource assignment subsystem 430 may actually be part of processing subsystem(s) 410. For instance, instead of sending allocation requests to a centralized resource assignment subsystem 430, each processing subsystem 410 may comprise logic equivalent to that of resource assignment subsystem 430. In systems 400 with multiple processing subsystems 410, an inter-subsystem signaling or messaging protocol may be used to ensure that resources 425 are not assigned to conflicting objects 490 at the same time.

In an embodiment, resource assignment subsystem 430 determines a resource 425 to be available for a specific object 425 if one or more resource assignment rules are met. These one or more additional rules include at least one rule based on the current value of a full status counter 462 or status indicator 476 associated with the specific object 425.

2.9. Miscellaneous

Systems 100 and 400 as described above illustrate only some of the many possible arrangements of components that may be configured to provide the functionality described herein. Other arrangements may include fewer, additional, or different components, and the division of work between the components may vary depending on the arrangement. For example, in some embodiments, thresholds 466 and status indicators 476 may be omitted, along with any other components relied upon exclusively by the omitted component(s). As another example, intermediate counters 472 may be stored in a different memory than status indicators 476, and/or thresholds 466 may be stored in a different memory than full counters 462.

In an embodiment, there may be multiple types of objects 490. For instance, resources 425 may be assigned on a per-processor and per-interface basis. Or resource usage may be controlled at not only an outgoing port level, but also at a group-of-ports level and/or an incoming port level. Hence, counters and statuses may be tracked for both types of objects 490 concurrently, and resource assignment may be preconditioned on checking statuses for multiple objects 490 with respect to which the resource is needed.

3.0. FUNCTIONAL OVERVIEW

In an embodiment, the efficiency of resource reporting in a computer system is increased using selective tracking and/or selective reporting techniques to track and report resource usage on a per-component basis. For illustrative purposes, certain flows described below are described below with respect to the example of message buffering in a networking device. However, the techniques are also applicable to a wide variety of systems in which resources may be assigned to different objects.

3.1. Reporting Flow with Optimized Tracking

Figure 5:
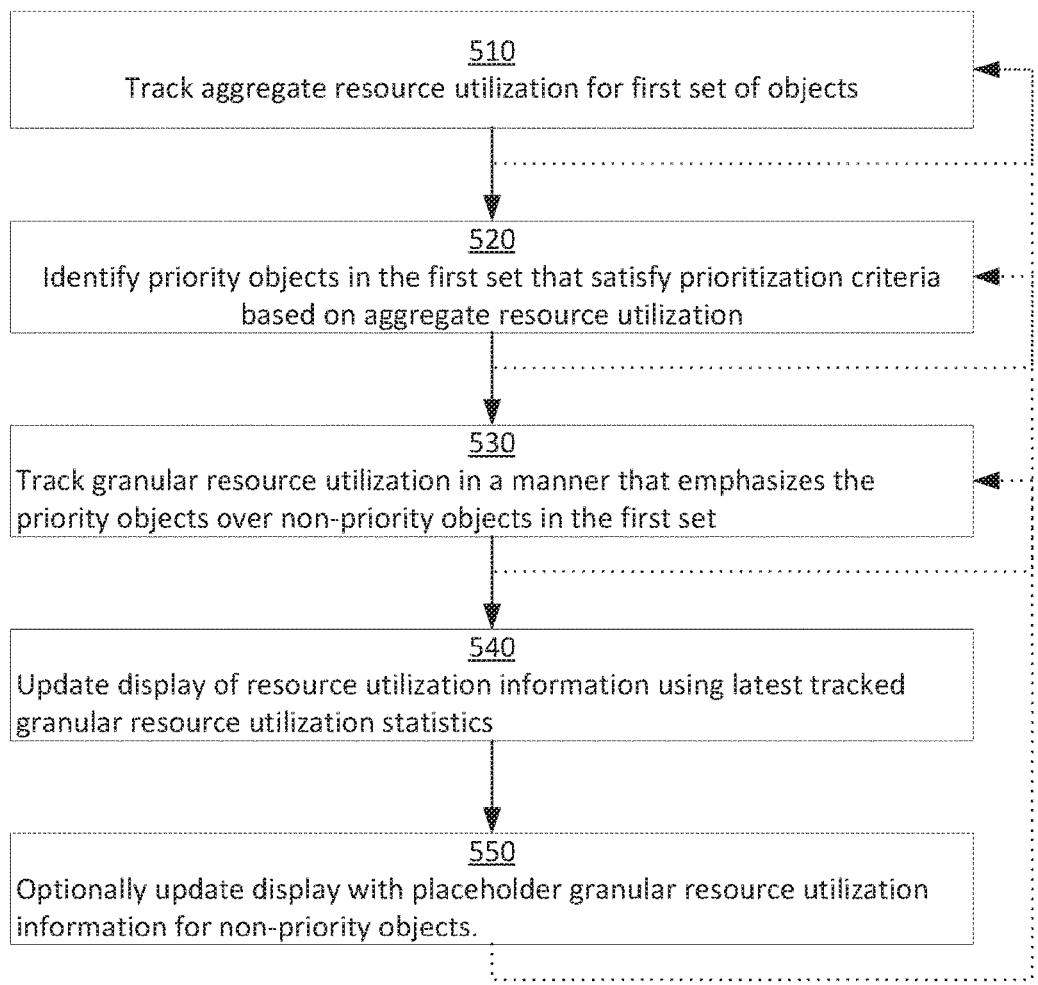
FIG. 5 illustrates an example flow for reporting resource utilization with optimizations for tracking of granular-level resource utilization.

FIG. 5 illustrates an example flow 500 for reporting resource utilization with optimizations for tracking of granular-level resource utilization, according to an embodiment. The various elements of flow 500 may be performed in a variety of systems, including systems such as systems 100, 200, and 400, described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Block 510 comprises tracking aggregate resource utilization for a first set of objects. The first set of objects may be any set of objects, including all objects to which resources may be assigned, a user-picked subset of objects, or certain type(s) of object. The tracked resources will generally of a same type, such as a unit of memory. A first set of counters, or "aggregate" counters, may exist, each counter corresponding to a different object in the first set. Each aggregate counter may reflect the total number or amount of resources assigned to the corresponding object.

The counter may be utilized for tracking in accordance with any suitable counting mechanism. In general, a suitable counting mechanism involves incrementing an aggregate counter by an appropriate amount responsive to or in anticipation of a system assigning a certain type of resource to a certain type of object, and decrementing the aggregate counter by the appropriate amount responsive to or in anticipation of the system unassigning the certain type of resource from a certain type of object. More specific details, such as the timing and manner of the incrementing and decrementing, vary depending on the embodiment.

More generally, the incrementing and decrementing may be performed in response to events which would typically require some assignment or unassignment of resources, without regard to whether a resource is actually ever assigned. For instance, the counter may be incremented upon receiving a message at a port, without consideration of whether the message will actually be buffered. The counter may then be decremented upon the message being discarded, again without regard to whether the message was ever actually buffered. The message may in fact never have been buffered, on account of no buffers being available for assignment. Nonetheless, the message may be counted against the resources assigned or utilized for the port for the purposes of the tracking techniques described herein. Thus, the tracking mechanism may be decoupled from the resource assignment mechanism, on the assumption that such events serve as proxy indicators of resource utilization (or at least how "busy" a given component of the system is).

As indicated by the return arrow to block 510, block 510 is performed on an ongoing basis, like most other elements of flow 500. That is, even as the remaining elements of flow 500 are being performed by other hardware or processes, block 510 will continue to be performed.

Performance of block 510 may actually have a number of purposes aside from reporting. For instance, as explained in other sections, the tracking information maintained as a result of block 510 may be used for determinations such as whether to assign future resources to a component, whether to take certain measures with respect to any processing routines being performed on behalf of a tracked object, and so forth.

Block 520 comprises identifying priority objects in the first set that satisfy prioritization criteria, based on the current resource utilization information tracked in block 510. The prioritization criteria may take different forms depending on an embodiment. For instance, the prioritization criteria may simply be a threshold against which the counter of each object in the first set is compared. Or, different thresholds may be stored for different objects. Other, more complicated rules may be utilized as the prioritization criteria, instead. For instance, the objects may be ranked by some function of their current counter values and/or historical values, and a predetermined number of the highest ranked objects may be selected as priority objects. Priority objects may also or instead be specified by a system administrator. Any combination of the foregoing criteria may also be utilized. Moreover, the prioritization criteria may change over time, based on user input or sophisticated reporting logic.

In an embodiment, block 520 involves maintaining one or more status indicators in association with each counter. Rather than comparing an object's counter to a threshold or other criteria, block 520 may also or instead involve comparing the object's status indicator(s) to threshold(s) or other criteria. The object's status indicators may, in turn, be updated on a continual basis by some other hardware or process, based on comparing thresholds or other criteria to the object's counter. For instance, an object may have a priority indicator that is stored in a high access rate memory, and block 520 may involve determining what the current priority status is, rather than having to read the object's counter and perform a comparison based thereon.

An object may have any number of status indicators that are updated similarly. Like the counter, a status indicator may have multiple purposes. For instance, a congestion indicator may be used both to identify the congestion level of an object when making routing decisions and to determine whether the object is a priority object for reporting purposes.

In general, the number of priority objects will be significantly smaller than the number of objects in the first set. Note that, as a result of the continual performance of block 510 and 520, the priority objects will change over time. Hence, a first object may at one time be a priority object, and then in subsequent iterations of block 520, be determined not to be a priority object.

Block 530 comprises tracking granular resource utilization for the first set of objects in a manner that emphasizes the priority objects over non-priority objects. The tracking of granular resource utilization involves maintaining a second set of granular counters for at least each of the priority objects. Each granular counter for an object corresponds to a distinct class or categorization of resource utilization use with respect to the object. The possible classes or categorizations may or may not be the same for each object in the first set. In an embodiment, each class or categorization is itself considered an object, and the set of possible classes or categorizations collectively form a second set of objects. Hence, each granular count for an object corresponds to a combination of that object with a different object in the second set.

For instance, a resource may be assigned to buffer a message received on an inbound port. The inbound port may be considered the object in the first set. The message may be destined for a specific outbound port using a specific traffic class. The same buffer may thus be considered to have been assigned for the specific outbound port and the specific traffic class as well. Thus, the specific outbound port or the specific traffic class may be considered a specific categorization of resource utilization for the inbound port, or in other words an object within the second set. Note that aggregate resource utilization may or may not also be tracked for this second set, and other hardware or processes might use this second set as a "first set" for other instances of flow 500.

The counting mechanism used to track granular resource utilization may be the same as that employed for counting aggregate resource utilization, or an entirely different mechanism may be employed. In an embodiment, all resource assignment events are tracked at the granular level in real-time or a delayed basis. In other embodiments, only certain resource assignment events may be tracked. That is, resource assignment events may be sampled, such that every third, tenth, or some other number of events for the object is analyzed to determine a specific categorization of use to which the event pertains, and the appropriate granular counter is updated after a determination has been made.

In some embodiments, multiple layers of granularity may exist (e.g. counters for breaking down an object's resource usage for the second set of objects by yet a third set of objects).

Priority objects may generally be emphasized in one of two manners. First, granular resource utilization may only be tracked for objects that are currently deemed priority objects. In this case, granular resource utilization for objects that are not currently deemed priority objects is not tracked at all. This may involve, for instance, allocating granular-level counters in memory for an object when the object is first identified as a priority object, and deallocating or reassigning those granular counters when the object is no longer identified as a priority object.

Second, granular resource utilization may be updated at a higher frequency for priority objects than for non-priority objects. This may involve, for instance, using a real-time counting mechanism for priority objects and a sampling-based or delayed counting mechanism for non-priority objects. Or, granular resource utilization may be tracked using a bifurcated counting strategy for all objects, with priority objects being scheduled for updating more frequently than non-priority objects. Or, the sampling rate used to track granular resource utilization may be a function of the priority level identified for an object.

In an embodiment, tracking granular resource utilization for an object further involves updating one or more granular status indicators for each of the granular counters. For instance, the level of congestion for an object may be classified on a scale of 1-4 for each different category of utilization for that object. As with other status indicators, the granular status indicators are determined by comparing the granular counters to some threshold(s) or other criteria, which may vary depending on the corresponding first object, second object, and/or time. Granular status indicators may only be kept for priority objects, in which case they may be allocated and deallocated as needed. Or, granular status indicators may be kept for all objects, but updated on a less frequent basis for non-priority objects, similar to the manner described above for updating non-priority counters less frequently.

Block 540 comprises updating a display of resource utilization information using the latest tracked granular resource utilization information. For instance, the display may be a table, a heat map, a bubble chart, a linked set of graphs, or any other suitable mechanism for reporting or visualizing the granular resource utilization information. The display generally depicts measures of resource utilization, though the measures may take a variety of forms. For instance, the measures may be the values of the granular counters, the values of the granular counters on a percentage basis, the values of the granular status indicators, functions of any of the foregoing, and so forth. The measures may be depicted as numerical values, or represented through any suitable data visualization technique (e.g. colors, symbols, etc.).

Block 540 may be performed at a single point in time (e.g. in response to a user's request for a snapshot of the latest resource usage), or on an ongoing basis. In the latter case, block 540 may be repeated periodically and/or in response to updating of granular status information in block 530, so that the measures depicted with the display appear to be fluctuating over time.

In some embodiments, the display mechanism may be configured to depict certain resource utilization information that is stale or lacking, such as granular measures that are for non-priority objects or otherwise insignificant. For example, the display may be a two-dimensional graph or table having the first set of objects as one axis and the second set of objects as another axis. However, granular information may not have been kept for non-priority objects in the first set. Or, even if kept, the granular information may not have been updated within a recent reporting interval.

In these embodiments, flow 500 may optionally continue to block 550, which comprises updating the display with placeholder granular resource utilization information for any information that is missing, including non-priority objects. The placeholder information may be, for instance, a default value such as "normal" or 0. Or, the placeholder information may be derived from the aggregate counter or status indicator. For instance, if the aggregate counter for an object is 100, and there are 5 granular counters for that object, each of the object's granular status indicators might read "20," "~20," "<=100," and so forth. Or, if the aggregate status indicator for the object is "1," each of the object's granular status indicators might read "1" or "~1." The placeholder information may, in some embodiments, simply be the last recorded granular measure, or a function of a history of previous granular measures.

In an embodiment, there may be multiple levels of priority objects corresponding to different prioritization criteria. The manner of tracking may be different for each level. In an embodiment, the prioritization of objects involves ranking objects, and the manner of tracking granular resource utilization is based on a function of that ranking. For instance, the highest priority object may be sampled at a highest frequency, a second highest priority set of objects may be sampled at a second highest priority, and so forth.

3.2. Reporting Flow with Optimized Communication

Figure 6:
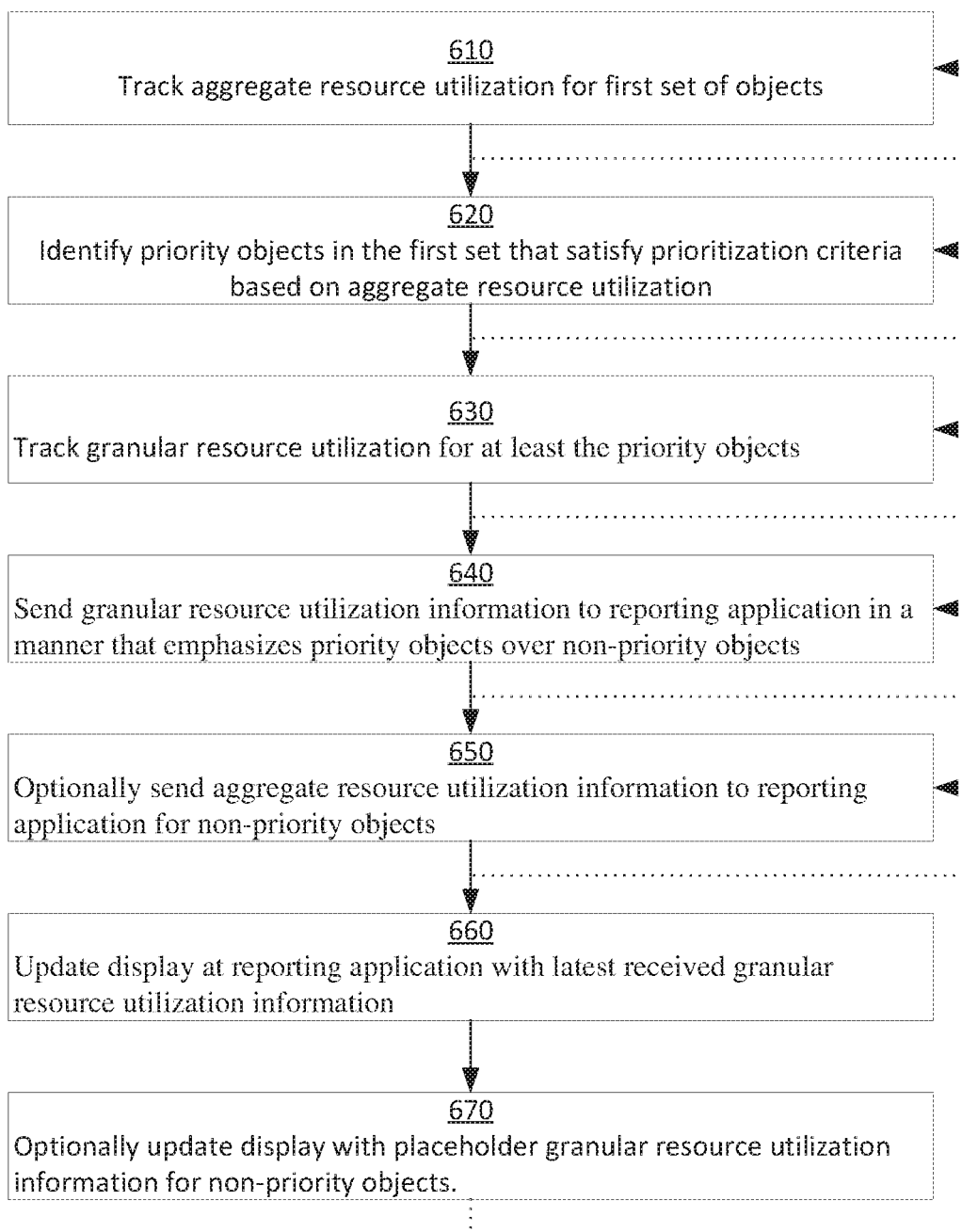
FIG. 6 illustrates an example flow for reporting resource utilization with optimizations for transmitting granular-level resource utilization information.

FIG. 6 illustrates an example flow 600 for reporting resource utilization, with optimizations for transmitting granular-level resource utilization information, according to an embodiment. The various elements of flow 600 may be performed in a variety of systems, including systems such as systems 100, 200, and 400, described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Blocks 610 and 620 proceed as with blocks 510 and 520 above. Block 630 comprises tracking granular resource utilization for at least the priority objects. The manner of the tracking may emphasize priority objects over non-priority objects, as with block 530 above, but need not necessarily do so. That is, for the purposes of flow 600, granular resource utilization may be tracked indiscriminately for all objects in the first set, or any subset thereof, so long as the identified priority objects are being tracked. Note that, since all objects may be tracked indiscriminately, block 630 may actually be performed prior to having yet identified the current priority objects in block 620.

Block 640 comprises sending granular resource utilization information to a reporting application in a manner that emphasizes the priority objects over non-priority objects in the first set. The reporting application may be a local application, such as a reporting application on a local web server or command line interface, or a network-based application, such as a reporting application on a monitoring device or data collection point deployed on a network. Depending on an embodiment, the granular resource utilization information may be reported as a series of stored data structures, network-based packets or other datagrams, function calls, and so forth.

The reported granular resource information may take a variety of forms, including value counters, status indicator values, and/or any other types of measures explained with respect to block 540 above. The granular resource utilization information may be sent as a single message (e.g. as a multi-dimensional matrix that is only populated with information for priority objects). Or, the granular resource utilization information may be reported as a series of messages, such as a vector for each object in the first set, or a separate message for each individual measure.

As with block 530, the manner of emphasizing granular resource utilization information may generally take one of two forms. First, granular resource utilization information may only be reported for current priority objects. Hence, granular resource utilization information is not reported for any object that is not a priority object, which in certain embodiments means that not all tracked granular resource information will be reported.

Second, granular resource utilization information may be reported for non-priority objects, but at a less frequent rate. For instance, granular information may be reported for priority objects once every second, while granular information for non-priority objects may only be reported every ten seconds. In some embodiments, a reporting interval may be defined, such as a fixed number of milliseconds, and reporting of an object with a lower priority level may be skipped for a number of reporting periods.

In embodiments where objects are tracked in a manner that emphasizes their priority level, emphasizing their priority level during block 640 may simply amount to sending new granular counters as they are updated or new granular status indicators as they are determined.

In an embodiment, the amount of communications may further be reduced by omitting certain granular measures even for priority objects. For instance, if a granular measure is lower than some reporting threshold, the granular measure may simply be deemed insignificant and not reported, or at least reported less frequently.

Block 650, which is optional, comprises sending aggregate resource utilization information to the reporting application, including aggregate resource utilization information for non-priority objects in the first set. Such information may be useful, for instance, to determine placeholder values for information that is not reported, and/or for higher-level reporting (e.g. a graph of aggregate status indicators) that drills down into reporting of the granular measures for a selected object.

Block 660 comprises updating a display at the reporting application with the latest received granular resource utilization information. Block 660 is performed by the reporting application in similar manner to block 540. In embodiments where granular information is not submitted as a complete matrix of the values to be depicted, a reporting interval may be designated, and the display may be updated based on the latest information received in each reporting interval.

In an embodiment, values for which no information is received in a reporting interval, or a previous number of reporting intervals, may be considered stale or missing (e.g. for non-priority objects or otherwise uninteresting values). To this end, block 670 may comprise optionally updating these stale or missing values with placeholder granular resource utilization information, in similar manner to block 550 above.

Flows 500 and 600 illustrate only some of the possible techniques for reporting resource usage. Other flows may involve additional or fewer elements, in potentially different arrangements. The various elements of flows 500 and 600 may be performed concurrently for different objects, such that reporting of resource utilization for any number of types of objects is performed in parallel. Moreover, flows 500 and 600 may be repeated or performed concurrently with respect to the same objects but different resources. For instance, if an object's resource utilization is being tracked for multiple types of resources at the same time, flow 500 or 600 may be performed for each type of resource. In some embodiments, flows 500 and 600 are combined as a single process flow, in which both tracking and reporting are optimized.

3.3. Optimized Counting Techniques

In an embodiment, the efficiency of resource tracking in a computer system is increased using a bifurcated counting technique to track and regulate resource usage on a per-component basis.

Figure 7:
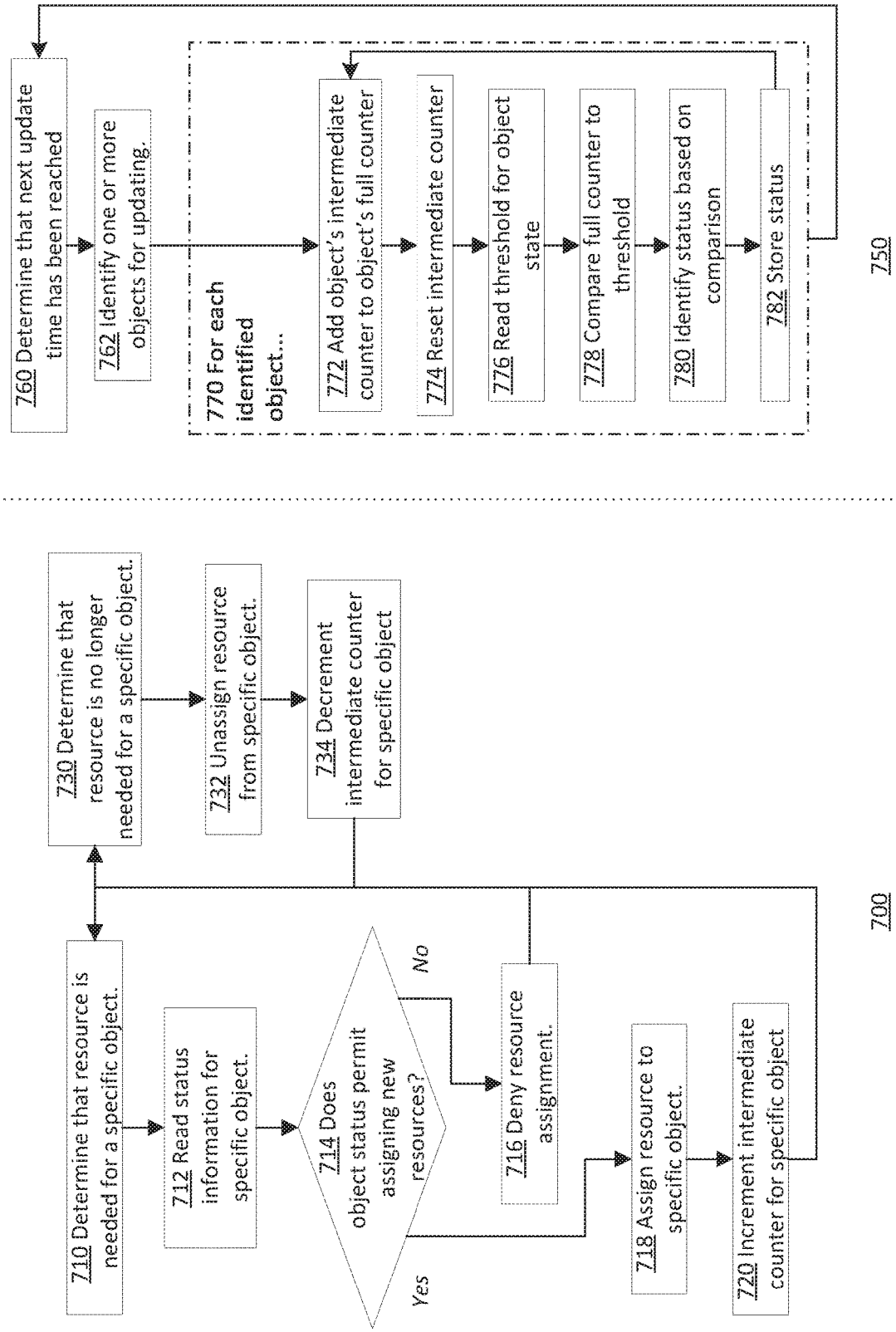
FIG. 7 illustrates example flows for tracking resource usage.

FIG. 7 illustrates example flows 700 and 750 for tracking resource usage, according to an embodiment. Flows 700 and 750 are non-limiting examples of techniques suitable for tracking aggregate and/or granular resource utilization in any of the systems or process flows described above. The various elements of flows 700 and 750 may be performed in a variety of systems, including systems such as system 400 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Resource Assignment Flow

Flow 700 is a flow for assigning resources, such as resources 425, to objects, such as object 490. Flow 700 begins at either block 710 or block 730. Block 710 comprises determining that a resource is needed for a specific object. A processing component such a processing subsystem 410 may be configured to perform block 710 in response to a certain event that is associated with the specific object. More specifically, the processing component is configured to perform a certain action in response to the event, and performance of this action requires the processing component to utilize the resource. Block 710 may also or instead comprise a resource assignment subsystem, such as subsystem 430, receiving a request from a processing component to assign a resource for the specific object.

For instance, in the context of message buffering in a networking device, block 710 may occur in response to receiving a message over a specific incoming port or a message destined for a specific outgoing port. The message may need to be stored in a message buffer for processing. For instance, the message may need to be buffered while the networking device determines a next device or address to which to route the address, applies one or more firewall rules, performs a deep packet inspection, manipulates message headers, performs traffic control, waits for an outgoing port to become available to send the message, and/or performs other actions with respect to the message. The number of available message buffers may be regulated on a per-port basis, in which case the specific object is the specific incoming port over which the message was received or the specific outgoing port to which the specific object is destined. Hence, block 710 comprises determining that a new message buffer is needed for the port.

Alternatively, or additionally, messages may be assigned to queues based on any of a variety of factors. For example, messages from a same set of ports may all be deemed to belong to the same queue. Or messages from the same port may be assigned to different queues based on service classes, destination addresses, or other characteristics of the messages. Message buffers may be regulated on a per-queue basis, in which case the specific object is the queue to which the message will be assigned.

Block 710 may, in some embodiments, further comprise identifying an amount of the resource that is needed. For instance, a size of memory to be allocated may be identified. In other embodiments, resources are assigned on a unit-by-unit basis, and all units are of the same size. Thus no specific amount is specified.

Block 712 comprises accessing status information for the specific object. The status information indicates whether the specific object is in a particular state. Assuming the status information is already stored, such as in state indicators 476, the status information may be read from an appropriate state indicator for the object. In some embodiments, block 712 may comprise reading multiple state indicators for multiple states.

Block 714 comprises determining whether, in view of the status information accessed in block 712, new resources can be assigned to the specific object. If so, then flow proceeds to block 718, in which a resource may be assigned to the specific object. If not, then flow proceeds to block 716, in which no resource is assigned to the specific object. For instance, block 714 may comprise executing hard-coded logic that branches to blocks 716 if a particular state is set, and branches to block 718 if the particular state is not set. Or, block 714 may comprise executing more complex logic based on the status information, such as a function of both whether the object is in a particular state as well as whether the object is in one or more additional states. The logic may instead be described by a configurable rule, which may be loaded from storage and evaluated with respect to status information.

In some embodiments, block 716 comprises terminating processing of whatever action or event required the resource. For instance, in the context of message buffering in a network device, the incoming message may simply be discarded. In an embodiment, block 716 may comprise sending a response to a processing component that requested the resource assignment. The response may indicate that the request has been denied. In some embodiments, in response to flow 700 branching to block 716, a processing component may, after waiting certain amount of time, repeat blocks 712 and 714 until a resource can be assigned, until a timeout period has lapsed, or until some other terminal condition is met.

Assignment of the resource in block 718 may comprise a variety of steps, depending on the embodiment. For instance, block 718 may comprise locating a specific resource that is available and returning an identifier or address of the resource. Block 718 may or may not also involve certain steps to ensure that the resource is no longer considered available for assignment to other objects, such as marking the resource as assigned in a resource map, placing a lock upon the resource, or not providing the location of the resource to a resource allocator while the resource is consumed. In the context of message buffering in a network device, the incoming message may be loaded into an available message buffer and processed accordingly.

In an embodiment, a number of determinations in addition to that of block 714 are made before proceeding to block 718, such as applying rules based on other states, checking a resource map to ensure that a resource (or a sufficient amount of resources) is in fact available, and so forth. Such determinations may be made before or after block 714, and if any of these determinations fail, flow may likewise proceed to block 716.

In an embodiment, one such determination may be to check the states of other objects implicated by the resource assignment. For instance, in the context of message buffering, a network device may limit the number of message buffers both with respect to per-port quotas and per-queue quotas. The determination of block 710 may involve identifying both a queue and a port to which the message pertains. Hence, status information is read for both the identified queue and the identified port in block 712. If the state of either the port or the queue does not permit the assignment of a new message buffer, the message may be dropped.

From block 718, flow proceeds to block 720. Block 720 comprises incrementing an intermediate counter for the specific object, such as an intermediate counter 472. In embodiments where resources are assigned on a unit-by-unit basis with units of the same size, the intermediate counter is always incremented by the same amount (e.g. one). In embodiments where different amounts of resources can be assigned, the intermediate counter may be incremented by a value that is proportional to the amount of resources being assigned.

Unassigning a Resource

Block 730 comprises determining that a resource is no longer needed for a specific object. Block 730 may occur, for instance, automatically upon a processing component concluding a processing task for which it requested assignment of the resource for the specific object in block 710. For instance, in the context of message buffering, block 730 may be performed whenever he message is finally processed, disposed of, routed, sent, or moved to another processing queue. Block 730 may also or instead comprise receiving a specific request to unassign a specific resource from a specific object. As yet another example, block 730 may be performed in response to a background process detecting that a specific resource assigned to a specific object is no longer locked or in use, or that the specific object no longer exists (e.g. in the case of objects that correspond to threads, data structures, categories, and so forth).

Block 732 comprises unassigning the specific resource from the specific object. Block 732 may comprise a variety of steps, depending on the embodiment. For instance, steps may be taken to reverse any actions taken during assignment of the specific resource in block 718, such as unlocking the resource, listing the resource as free in a resource map, and so forth. Block 734 comprises decrementing the intermediate counter for the specific object. For instance, the intermediate counter may be reduced by an amount corresponding to the amount the intermediate counter was incremented in block 720.

From blocks 720 and 734, flow 700 may return to either block 710 or 730 for assigning or unassigning other resources for the same object and/or for different objects.

Updating Status Information

Flow 750 is a flow for updating counter and/or status information of objects to which resources may be assigned, per flow 700. Both flow 700 and flow 750 are performed on an ongoing basis during the operation of the system in which they are implemented. Flow 700 is performed whenever events that trigger a resource assignment (or unassignment) occur. Meanwhile, flow 750 may be performed less frequently and/or asynchronously relative to flow 700. For instance, flow 700 may be performed in response to each resource assignment or other trackable event, while flow 750 is performed periodically or on some other schedule independent of resource assignments or trackable events.

Flow 750 begins with block 760. Block 760 comprises determining that a next update time has been reached. Block 760 may occur, for example, on a periodic basis, such as once every clock cycle, once every other clock cycle, once every n clock cycles, every second, and so forth. Block 760 may also or instead occur at previously scheduled times.

Block 760 may also or instead occur in response to certain events, such as detecting that an intermediate counter is above a threshold, or detecting that a measure of processor utilization is below a certain percentage.

Block 762 comprises identifying one or more objects whose counters and status information are to be updated. For instance, the objects may be arranged in an arbitrary "round-robin" sequence, and each iteration of flow 750 may involve selecting a next object in the sequence, or a next group of objects in the sequence. Once the sequence is complete, the sequence may be repeated. Thus, for example, a first and second object may be chosen in the first iteration of flow 750, a third and fourth object may be chosen in the second iteration of flow 750, and so forth, until the end of the sequence is reached, and the first two objects are selected again. A variety of other techniques of varying sophistication may also or instead be used to identify the one or more objects, and these techniques are described in greater detail in subsequent sections.

In an embodiment, a fixed number of objects are selected in each iteration. In other embodiments, there is a maximum number of objects that may be selected, but fewer than the maximum number of objects may instead be selected. Any number of objects may be selected, including zero or one. In some embodiments, the efficiency of the described technique may be increased when significantly fewer than the total number of objects are selected. When choosing the fixed number of objects to update per iteration, consideration may be taken of a number of factors, such as the amount of memory needed to store the intermediate counters (as explained in previous sections), the maximum amount of error that is acceptable in full counters (also as explained in previous sections), the amount of processing resources needed to perform the updating, and so forth.

Block 770 comprises updating the counters and status information for each identified object. The updated counters may be, for instance, full counters 462 (e.g. counters 162 and 163). The updated status information may include some or all of the status indicators 476 (e.g. counters 175, 176 and/or 177) for an object. In an embodiment, block 770 comprises, for each identified object, performing blocks 772-782.

Block 772 comprises adding an object's intermediate counter to the object's full counter. As a result of the ongoing performance of flow 700, the intermediate counter should reflect the net change in resource assignments since the object's full counter was last updated (i.e. since the object's last sample time). Thus, in some embodiments, adding the intermediate counter to the full counter may result in the full counter at least temporarily storing an accurate count of the number of resources assigned to the object. The full counter may thus be viewed as a snapshot of the number of resources assigned to the object at the object's last sample time. Note that, if the intermediate counter is in fact negative in value on account of a greater number of resources having been unassigned since the object's status was last updated, the result of block 772 is that the full counter will decrease.

According to some embodiments, updates to full counters may be optimized utilizing a read-modify-write operation such that only two memory access are required of the slower memory. A read operation reads the current full counter value. This value is then incremented by the corresponding intermediate counter value. The updated full counter may then be written back to the same location. In an embodiment, the read-modify-write operation may be accomplished in a single clock cycle if two-ported memory is used to store the full counter. In other words, a first memory port is used to read the current value of the full counter, and a second memory port is used for writing back the updated value. In another embodiment, the read-modify-write operation may be performed over two clock cycles if single-ported memory is used to store the full counter. That is, on the first cycle, the memory port is used to read the current value of the full counter, while on the next cycle, the updated value is written back using the same memory port. This embodiment supports higher operating frequencies for the memory used to store the full counter, at the expense of reducing the rate at which full counters may be updated, thus increasing the potential amount of inaccuracy in the full counters.

Block 774 comprises resetting the intermediate counter to zero, since the intermediate counter counts resource assignments since the last sample time, and the last sample time by definition has just occurred. In an embodiment, blocks 772 and 774 may be performed using a transaction or other locking mechanism designed to ensure that no resource assignments occur between block 772 and block 774, which would effectively result in the resource assignment not being counted. However, in other embodiments, the expected loss in accuracy from such occurrences is small enough in both magnitude and cost to warrant foregoing any locking mechanism.

Block 776 comprises reading threshold information for an object's state. For example, block 776 may comprise reading a threshold 466. Depending on the embodiment, thresholds may be read at the same time as the full counter, or at separate times. Block 778 comprises comparing the full counter, as updated in block 772, to the threshold information. Block 780 comprises, based on the comparison, identifying status information for the object. Block 782 comprises storing the status information.

For example, the threshold read in block 776 may indicate a value above which an object is considered to be in a flow control state. Block 778 may thus comprise determining whether the full counter for the object is above the threshold value. Block 780 may comprise setting a bit for the flow control state to 0 or 1, depending on whether full counter is above the threshold value. In other embodiments, more complex thresholds and comparisons may be involved in identifying the status of the object, such as thresholds based on ranges and/or that define non-binary states.

In an embodiment, blocks 772-782 may be repeated for any number of possible states for an object.

Flows 700 and 750 illustrate only some of the possible techniques for tracking resource usage. Other flows may involve additional or fewer elements, in potentially different arrangements. The various elements of flow 700 and 750 may be performed concurrently for different objects, such that any number resource assignments or allocations are performed in parallel. Moreover, flows 700 and 750 may be repeated or performed concurrently with respect to the same objects but different resources. For instance, if an object's resource assignments are being tracked for multiple types of resources at the same time, flow 700 and 750 may be performed for each type of resource, potentially in parallel.

Both the frequency with which flow 750 is performed and the number of full counters that are updated in each pass of flow 750 may, in some embodiments, be adjusted. These factors, as well as the frequency with which resource assignments or trackable events may occur, may be utilized to select a suitable size (e.g. number of bits) for the intermediate counters, so as to ensure that the intermediate counters do not grow to a value larger than can be stored. Conversely, the frequency with which full counters are updated may be adjusted dynamically based on the sizes of the intermediate counters and/or the whether any intermediate counters are at risk to exceed their maximum values. For instance, updates to some or all of the full counters may be skipped to conserve processing power if their corresponding intermediate counters are not at risk for exceeding their maximum magnitudes before the full counters are scheduled for their next update.

As already described, the update frequencies may also be used to determine an expected deviation in the accuracy of the full counters (e.g. an upper limit for how inaccurate, on average, the full counters are expected to be at any given time). In an embodiment, thresholds for a certain type of state (e.g. a state used for determining whether to deny resource assignment requests) may be selected such that the sum of each object's threshold for the state plus the expected deviation does not surpass the total number of available resources. This expected deviation (and hence the thresholds) may be adjusted over time based on historical data such as, for example, how large the intermediate counters actually tend to grow.

In an embodiment, different processes or components may be responsible for updating the full counters and the status information. That is, there may be one component executing one flow for updating full counters, and another component executing another flow for updating statuses.

3.4. General Counting Flow

According to an embodiment, the counting techniques described herein may more generally be performed for a wide variety of counting applications other than resource management. For example, according to one flow, the techniques described herein may be performed to track any sort of countable event. Any time a countable event occurs, an intermediate counter such as intermediate counter 462 may be incremented or decremented by amount associated with the countable event. For instance, flow 700 may simply omit blocks 710-716 and 730. A separate process may update full counters such as full counters 472 on a periodic or other basis, in similar manner as flow 750. Multiple counters may use to track different types of countable events and/or countable events associated with different components, classes, metadata, data structures, entities, or other objects.

Such a generalized flow may or may not involve maintaining and updating status information. The full counters may nonetheless be used in making a wide variety of state-based or other determinations for which a "delayed" or "stale" count is acceptable, rather than a completely accurate count. Moreover, some applications may benefit from storing intermediate counters in a separate type of memory than the full counters, while others may not.

4.0. IMPLEMENTATION EXAMPLES

4.1. Heat Maps for Network Switching Devices

In an embodiment, the described techniques are utilized for providing insight into the use of internal network switching device resources, so as to enable users to quickly identify problems. User can quickly identify whether existing configurations and/or traffic patterns should change to address observed issues. Switching devices share resources, such as buffers, at varying levels of granularity, such as for ports, queues, group of ports, traffic class, and so forth. The described reporting techniques may provide insight into the use of such shared resources, particularly for congestion events.

Mechanism for reporting resource usage in a network switching device are complicated in view of a number of issues. The mechanisms must be able to scale, as the number of objects that share resources within network devices generally increases over time, as the switch densities, number of queues, and other elements increase with successive device releases. Moreover, aggregate device bandwidth increases over time, resulting in very fast changes in congestion points. Ports can become congested and drop packets very quickly without user having insight into reason for drops. Mechanisms for providing insight must be able to provide insight into these fast, transient congestion events. As such, the described techniques provide high value, even more so when implemented as a hardware-based solution.

In one embodiment, the described techniques may be utilized to provide a mechanism that enables fast reporting of resource usage that: 1) reports the top consumers of resources (i.e. the objects with the highest relative numbers of resource assignments) based on destination; 2) reports consumption, for the top consumers, on a per-source basis; and 3) assuming M destinations and N sources, avoids the cost of maintaining a M×N state matrix. In so doing, the mechanism only provides resource usage information for the most over-utilized (e.g. congested) resources, under the assumption that it is not cost effective to maintain usage information for idle or low utilization resources.

The mechanism involves, among other aspects, destination-based resource tracking. That is, resource usage, such as the number of buffers used, packet descriptors used, and so forth, is tracked on a per destination port basis. The tracking may be performed in a variety of manners described in other sections. In one embodiment, the tracking leverages and operates in parallel with existing counting logic used for other purposes such as resource assignment, thus providing similar cost and efficiency tradeoffs while sharing resources to reduce the combined cost of the resource assignment mechanism.

The resource usage of each destination port is then monitored and assigned a congestion level. According to one embodiment, congestion levels may be assigned using a set of thresholds that are compared to current counts of resource usage. For example, three thresholds could be used to determine four congestion levels, including a NO_CONGESTION level having a value of 0, a LOW_CONGESTION level having a value of 1, a MEDIUM_CONGESTION level having a value of 2, and a HEAVY_CONGESTION level having a value of 3. Thresholds may be set at even increments relative to the range of possible count values, or thresholds may be set in a non-linear fashion to manipulate the reporting rate.

"Hot spots" of high resource usage are then identified, if present, by inspecting the egress ports with the highest congestion levels. In an embodiment, a hot spot threshold level may be defined (such as 1 in the example above), against which the congestion level is compared. Egress ports with congestion levels above (or at, in some embodiments) the hotspot threshold are marked as being hotspots. In another embodiment, hot spot egress ports may be a subset of egress ports, of pre-defined size, whose congestion levels are currently the largest. In yet other embodiments, hot spot ports may also or instead include egress ports specifically identified by a user, or egress ports that have historically had high resource usage.

For a given egress port that falls within one of these hot spots, each source port's contribution to the congestion level of the given egress port is tracked individually. A source port's contribution may be tracked in a variety of manners, such as by sampling updates to a congested egress port and updating a granular, per-source port counter for the egress port whenever new resource usage is incurred on behalf of activity for the source port. In some embodiments, only a fixed number of ingress ports are tracked for a given egress port, such as the ingress ports with the highest amount of traffic historically or within a recent period of time.

In some embodiments, additional actions may be taken for egress ports that are considered hot spots. For example, the actions may include reporting the congestion level of an egress port that is marked as a hot spot at a faster rate than other ports. This may be useful because often the rate of congestion level change for hot spot ports changes much more quickly than that of other ports. Moreover, the increased rate of reporting gives insight into the duration of a congestion event with finer granularity.

A two dimensional presentation, such as a heat map, bubble chart, table, or any other suitable presentation, may then be generated by constructing a three-dimensional matrix indicating congestion levels per each pairing of an ingress port with an egress port. However, in embodiments where the congestion levels must be reported from the tracking component to another system component responsible for generating the presentation (e.g. such as a centralized monitoring application), the system may be configured to avoid actually sending the entire matrix. Rather, congestion levels may be reported only for the hot spots—i.e. only for pairings of ingress ports and egress ports that have actually been determined to have high resource usage—thus reducing network transmission time and bandwidth. The remaining portions of the matrix may be left blank, or replaced with placeholder values that indicate insignificant congestion levels.

In an embodiment, congestion levels may be reported in regular intervals, with all egress ports being reported, or only a subset of egress ports being reported to reduce congestion message transmission time. For instance, the mechanism can be configured to report only egress port (only) congestion levels, or to report congestion levels only for pairings of ingress ports and egress ports that satisfy or above a defined congestion level threshold. As another example, the mechanism may optionally be configured to report congestion levels for pairings of ingress ports with hotspot ports, and egress port congestion levels only for the remaining egress ports.

In an embodiment, congestion levels may be filtered such that only egress ports, or pairings of ingress ports with egress ports whose congestion levels are greater than a defined congestion level report threshold, are sent to a receiver (i.e. CPU, collection device, etc.). There may be multiple congestion level report thresholds, where each threshold conveys a report frequency. For instance, congestion levels might be reported every reporting interval for any egress port whose congestion level satisfies a CONGESTION_LEVEL_3_REPORT_THRESHOLD, while congestion levels might be reported every eighth reporting interval for any egress port whose congestion level satisfies a CONGESTION_LEVEL_0_REPORT_THRESHOLD.

In an embodiment, congestion levels are reported using a one-dimensional vector indicating congestion levels on a per-egress port basis. A heat map or other presentation may be constructed from multiple such vectors received over a period of time referred to as a reporting interval. Reporting congestion levels in this manner may enable faster reporting, by transmitting congestion levels only for ports which are of key interest (e.g. ports with high congestion levels). For example, a device may be configured to only send egress port congestion level information when the congestion level is above a defined threshold. A congestion level of 0 may be assumed for any egress port whose congestion level was not reported in a given reporting interval.

Alternatively, congestion levels may be reported using a two-dimensional matrix that has been stripped to include pairings of ingress ports and egress ports whose congestion levels are above a defined threshold. A congestion level of 0 may be assumed for any pairing of ingress ports and egress ports not found in the matrix.

While the above example is described under the assumption that egress ports are analyzed for hot spots, the roles of the egress ports and the ingress ports may be reversed in other embodiments. In yet other embodiments, the "source" may be a traffic class, queue, or some other categorization of usage rather than an ingress port or egress port. Moreover, while the technique is described with respect to congestion levels, other types of resource utilization levels or statuses may be tracked instead. More generally, the techniques in this section may also be applied to resource utilization reporting for any types of objects and statuses.

4.2. Example Update Selection Techniques

As explained previously, a variety of techniques may be used to identify the one or more objects whose counter(s) require updating in a given update cycle (e.g. in a given iteration of flow 750). For instance, the objects may be arranged in an arbitrary "round-robin" sequence, and selected accordingly. As another example, the identified objects may be selected at random.

As yet another example, the identified objects may be the objects whose intermediate counters have the highest magnitude. This approach is also referred to as a "FindMax" approach. For instance, the objects may be sorted by value or absolute value of their respective intermediate counters. Or, the identified objects may be a set of objects whose intermediate counters values are over a current threshold.

Hybrid selection techniques may also be utilized. For example, every odd iteration of flow 750 may involve selecting a random set of objects, or the next set of objects in an arbitrary round-robin sequence, while every even iteration may involve selecting the objects having the highest current magnitude. Or, every first iteration may involve selecting a pre-defined and specific set of objects, while every second and third iteration may involve selecting the next objects in the round-robin sequence. As yet another example, one object updated in every iteration may be selected from an arbitrary round-robin sequence, another object updated in every iteration may be selected from a group of objects dynamically calculated to be high-priority objects, and another object updated in every iteration may be selected from a group of manufacturer-designated high priority objects.

More generally, the hybrid selection technique may alternate between two or more selection strategies in different iterations, or utilizing multiple selection techniques to select multiple objects in a single iteration. Certain strategies may even be repeated or utilized more frequently than others.

In an embodiment, hybrid selection techniques may be designed so as to include, either in a single iteration or over the course of multiple iterations, both objects selected using strateg(ies) intended to ensure that all counters are updated within a certain amount of time (e.g. round robin strategies that cycle through a sequence of all objects over a given number of iterations), and objects selected using strateg(ies) that would rarely or never select objects deemed to be lower in priority. A strategy designed to ensure that all counters are updated within a certain amount of time shall herein be considered to be a baseline strategy, and updates made as a result of this process shall be considered "regular" updates. Strategies utilized as part of a hybrid selection technique outside of the baseline strategy are considered optimizing strategies, and updates made as a result thereof referred may be referred to as irregular updates.

The FindMax strategy is thus one example of a strategy that may be utilized as an optimizing strategy. As another example, rather than sorting by current magnitude, a background process may track the magnitudes of the intermediate counters over time, and periodically sequence the objects based on their average historical magnitude. An optimizing strategy may thus select the object(s) with highest average historical magnitude. As yet another example, a user may designate certain objects as high priority objects, and an optimizing strategy may thus select these high priority objects.

Another optimizing strategy may involve sorting the objects by the differences between their respective full counters and thresholds, such that the object(s) that are currently closest to their respective thresholds are selected. As yet another example, the average proximity of a full counter to a threshold may be calculated over time and used to prioritize its corresponding object. Objects may also or instead be sorted by functions that are based on any of the foregoing factors.

As an alternative to sorting objects by some or all of the foregoing factors, a similar optimizing strategy may be to simply maintain state information indicating when an object is currently considered to be of higher priority for update purposes. This "high update priority" state may be updated periodically (e.g. during regular updates to the full counter, in similar manner to the rest of status information 176). The objects may then be arranged in a sequence. This sequence may omit objects that are not currently in the high update priority state. Or, any objects within the sequence that are not within the high update priority state may be ignored during the selection process. For instance, an object may be considered to be in the high update priority state when it is within a certain amount or percentage of its threshold. The amount may be, for instance, the maximum possible error amount in the object's full counter (as calculated based on the baseline strategy) or a function thereof. The object would thus be available for selection by an optimizing selection technique, whereas an object not in the high update priority state would not be selectable.

As another optimizing strategy, or even as an alternative to a hybrid selection technique, a weighted or biased selection strategy may be utilized. Objects may be prioritized by intermediate counter magnitude, average intermediate counter magnitude, current full counter threshold proximity, average full counter threshold proximity, current state, user priority designations, object type, predicted use, and/or any other factor. The objects may be assigned weights based on these priorities. A weighted or biased approach to scheduling, such as a weighted lottery random selection algorithm or a weighted round-robin sequence, may then be used to select the objects in block 762.

For example, continuing with the example of per-port messaging queues in a networking device, the networking device may include both 1 Gbps ports and 10 Gbps ports. The ports may be treated as different object types, weighted differently for scheduling purposes. Updates may be scheduled in a weighted fashion such that the 10 Gbps ports are more likely (e.g. 2× more likely, 10× more likely, etc.) to be updated in any given iteration than the 1 Gbps ports. That is, for instance, a schedule may be designed whereby different objects may be assigned to different schedule slots. Assuming the 10 Gbps ports are weighted 10:1 relative to the 1 Gbps ports, for every ten schedule slots assigned to a 10 Gbps port, a 1 Gbps port would be assigned to one schedule slot. This approach may be hybridized with one or more other approaches, such as the FindMax approach described above.

According to an embodiment, instead of utilizing a round-robin approach, the baseline strategy may be used to select objects whose full counters are most stale. For instance, the times of object updates or number of clock cycles since an object was last updated may be tracked. The baseline approach may select the object(s) whose time or number of clock cycles since last being updated is largest.

The actual determination of which object(s) are to be updated may occur as needed (e.g. in the same clock cycle or period as the object is needed), or in advance. As an example of the latter, a resource update controller subsystem may separately generate and update an array of schedule slots. The resource update controller subsystem may populate the slots with object-identifying information in a sequence based on one or more of the foregoing techniques. When it comes time to perform an update, the resource updating subsystem may "pop" the identity of the next object(s) to update off the array. Empty slots may be generated to indicate periods when no updates are to be performed. As yet another example, a resource update controller may generate and maintain an internal schedule of times to perform updates for specific objects, and command a resource updating subsystem to perform updates for the specific objects when their scheduled times arrive.

4.3. Example Counting Walk-Through

FIG. 8 is a diagram 800 that illustrates an example set of counters and status information changing over time in accordance with the described techniques, according to an embodiment. Diagram 800 more specifically depicts counters and other information for objects 890, labeled as O1 through O8. For each object 890, a full counter 862 and threshold 866 are stored in a first memory location (e.g. a lower cost memory), and an intermediate counter 872 and state bit 876 are stored in a second memory location (e.g. a higher cost memory). For simplification of discussion, all data is depicted in decimal form rather than as bits or bytes. Nonetheless, as illustrated, the amount of memory (i.e. the number of bits or bytes) used to store intermediate counters 872 is significantly smaller than used to store full counters 862, on account of assumptions that the update process illustrated herein prevents the intermediate counters 872 from growing more than a certain amount.

FIG. 8 depicts the state of the foregoing with respect to four instances in time, referred to as t0 through t3. Each time corresponds to a new update. The times may be evenly incremented. For instance, each time may correspond to a new clock cycle, or a new set of clock cycles, in a succession of clock cycles. Or, the times may be times at which updates have been scheduled, without necessarily being evenly incremented.

At t0, full counters 862 have full counter values 862a, intermediate counters 872 have intermediate counter values 872a, and state bits have state bit values 876a. As illustrated by the bolded outlining of their corresponding data, two objects have been recently updated—O1 and O2. These objects were selected for update using a round-robin approach. Their corresponding intermediate counter values 872a have been reset to 0. The state bit values 876a for O2 and O4 are set, on account of their corresponding full counter values 862a being higher than their respective thresholds 866.

At t1, a number of countable events (e.g. resources allocated and deallocated) have occurred since t0. For each countable event, the intermediate counter 872 has been increased or decreased by 1. These countable events have resulted in net increases to intermediate counter values 872b for certain intermediate counters 872 (e.g. for O1 and O5), and net decreases to the intermediate counter values 872b for other certain intermediate counters 872 (e.g. for O2 and O8) relative to t0. For example, one negative countable event has occurred for O2, lowering its intermediate counter value 872b to −01, while two positive countable events have occurred for O7, raising its intermediate counter value 872b to 00.

Objects O3 and O4 have been selected for update at t1. Consequently, the values of their intermediate counters 872a from t0 have been added to the values of their full counters 862a from t0 to arrive at the full counter values 862b for O3 and O4. Meanwhile, their intermediate counter values 872b have been reset to 0.

Furthermore, at t1, the full counters 862b for O3 and O4 have been compared to their respective threshold values 866. This comparison has indicated that the full counter values 862b for neither O3 nor O4 are above their respective thresholds 866, and thus the respective state bit values 876b for O3 and O4 are not set. This means, for instance, that the state bit 876b for O4 is now different than the state bit 876a, since the full counter 862b for O4 (394) has been decreased below the threshold 866 for O4 (400) on account of adding the intermediate counter value 872a for O4 (−07) to the full counter 862 for O4 (401).

All other full counter values 862b and state bit values 876b are not affected by the update to O3 and O4.

At t2, again a number of countable events have occurred, resulting in the intermediate counter values 872c. Objects O5 and O6 are updated, resulting in their full counter values 862c and state bit values 876c. Their intermediate counters 872c have been reset.

At t3, again a number of countable events have occurred, resulting in the intermediate counter values 872d. Objects O5 and O6 are updated, resulting in their full counter values 862d and state bit values 876d. Their intermediate counters 872d have been reset.

The process may then repeat at a time t4, with O1 and O2 again being updated, followed by O3 and O4 at a time t5, and so forth.

It will be noted that, for illustrative purposes, the embodiment depicted in FIG. 8 involves a relatively small number of objects 890. Other embodiments may include many more objects 890, along with intermediate counters 872, thresholds 866, and full counters 862 that grow significantly larger in size. Moreover, each object 890 may be associated with one or more additional thresholds 866 corresponding to one or more additional state bits 872.

While FIG. 8 illustrates a round-robin update technique, it will also be clear that alternative selection techniques may likewise be implemented, such as described above. For example, a hybrid selection policy may be implemented by selecting two objects using a round-robin baseline strategy at even times (e.g. t0, t2, etc.), and selecting two "high priority" objects using an optimizing strategy at odd times (e.g. t1, t3, etc.). For example, supposing O8 and O5 were historically high in volume, O8 and O5 may be selected at t1 per the optimizing strategy, O3 and O4 would then be selected at t2 per the round-robin strategy, O8 and O5 would then be selected again at t3 per the optimizing strategy, O5 and O6 would be selected at t4 per the round-robin strategy, and so forth. In some embodiments, the pool of high priority objects may be greater than two, in which case the optimizing strategy may select different objects each time. Moreover, other embodiments may update a smaller or greater number of objects than two at each time.

5.0. EXAMPLE EMBODIMENTS

Examples of some embodiments are represented, without limitation, in the following clauses.

According to an embodiment, a networking apparatus comprises: communication interfaces coupled to one or more networks, the communication interfaces configured to receive and send messages; a switching subsystem configured to process routable messages received over the communication interfaces; a tracking subsystem configured to track resources used by the apparatus while processing the routable messages, at least by tracking an aggregate count of resources assigned for each object in a first set of objects, each object in the first set corresponding to one of: an ingress port, egress port, processing queue, group of ports, or traffic class; a status update system configured to update resource status information for each object in the first set by comparing a current aggregate count of resource assignments for the object to one or more thresholds for the object, the resource status information including a priority indicator indicating whether the object has a priority status; a reporting subsystem configured to send, to a receiver, granular measures of resource assignments for priority objects within the first set, the priority objects being objects that currently have the priority status, each of the granular measures for a particular object reflecting how many resources have been assigned to a different combination of the particular object with another object in a second set of objects; wherein the reporting subsystem is further configured send the granular measures of resource assignments for the priority objects more frequently than granular measures of resource utilization for other objects in the first set that do not have the priority status.

In an embodiment, the networking apparatus is configured not to send granular measures of resource assignments for other objects in the first set that do not have the priority status.

In an embodiment, the receiver is configured to generate a heat map of granular measures of resource assignments, a first axis of the heat map corresponding to the first set of objects and a second axis of the heat map corresponding to the second set of objects, the receiver further configured to display placeholder values for granular measures depicted in the heat map but not received from the networking apparatus.

In an embodiment, the networking apparatus further comprises a granular tracking subsystem configured to maintain and update the granular measures for objects within the first set of objects that currently have the priority status, without maintaining and updating granular measures for objects within the first set that do not currently have the priority status.

In an embodiment, the granular measures are granular status indicators, and the status update system is further configured to determine the granular status indicators by comparing associated granular thresholds with granular counts of pairings of objects from the first set with objects in the second set.

In an embodiment, the resources are memory buffers used to store the messages, or portions thereof, wherein the granular status indicators are priority status indicators, wherein the granular status indicators indicate congestion levels.

In an embodiment, the granular measures are counts of amounts of resources.

In an embodiment, the networking apparatus further comprises a resource assignment subsystem configured to determine whether to assign resources to certain objects based on current resource status information for the certain objects.

In an embodiment, the switching subsystem is further configured to use current resource status information to determine whether to buffer or to drop a message that has been routed to or through a given object in the first set. In an embodiment, the switching subsystem is further configured to use current resource status information to determine whether to apply flow control to a message that has been routed to or through a given object in the first set. In an embodiment, the switching subsystem is further configured to use current resource status information to determine whether to mark a message that has been routed to or through a given object in the first set with a particular flag.

In an embodiment, each aggregate count is stored in a delayed counter that reflects resource assignments for a corresponding object in the first set as of a last sample time for the corresponding object, wherein the tracking subsystem is further configured to maintain an intermediate counter for each aggregate count that reflects changes in resource assignments for the corresponding object since the last sample time for the corresponding object, and to update the aggregate count using the intermediate counter at each of a plurality of sample times for the corresponding object.

In an embodiment, the networking apparatus further comprises a scheduling subsystem configured to determine the sample times for each object in the first set based at least partially upon the resource status information.

In an embodiment, the networking apparatus further comprises: one or more first memories configured to store full status counters, the full status counters including each aggregate count; one or more second memories configured to store intermediate counters, the one or more second memories being different than the one or more first memories, each of the intermediate counters corresponding to a different one of the full status counters; wherein the tracking subsystem is further configured to increment the intermediate counters responsive to the communication interfaces receiving the routable messages, to decrement the intermediate counters responsive to the communication interfaces sending the routable messages and/or the routing subsystem disposing of the routable messages, and to update the full status counters at sample times based on the intermediate counters.

According to an embodiment, a system comprises: networked devices coupled to one or more networks, each of the networked devices comprising: a counting subsystem configured to track aggregate-level resource assignments for first objects, and further configured to track granular-level resource assignments for at least some of the first objects relative to multiple categories of assignments; and a reporting subsystem configured to send, to a monitoring device coupled to the one or more networks, granular-level resource status indicators for particular first objects when those particular first objects have aggregate-level resource assignments that satisfy particular conditions, the granular-level resource status indicators reflecting the granular-level resource assignments; the monitoring device configured to present reports of resource utilization at the networked devices, a given report of the reports presenting granular-level resource status indicators for each of the first objects of a given networked device relative to the multiple categories of assignments of the given networked device, the given report presenting placeholder values for granular-level resource status indicators not sent by the reporting subsystem of the given network device in a recent period of time.

In an embodiment, the counting subsystem is configured to track granular-level resource assignments for a given first object only when a count of aggregate-level resource assignments for the given first object satisfies the particular conditions.

In an embodiment, the reporting subsystem is configured to send granular-level resource assignments for a given first object only when a count of aggregate-level resource assignments for the given first object satisfies the particular conditions.

In an embodiment, the reporting subsystem is further configured to only send a given granular-level resource status indicator when the given granular-level resource status indicator has a value other than a default placeholder value.

In an embodiment, the reporting subsystem is further configured to send, to the monitoring device, aggregate-level status indicators for the first objects, the aggregate-level status indicators determined based on the tracked aggregate-level resource assignments; and the monitoring device is configured to use the aggregate-level status indicators to determine the placeholder values.

In an embodiment, the given report is a multi-dimensional graph having a first axis that corresponds to the first objects and a second axis that corresponds to the multiple categories, the graph showing a matrix of granular-level resource status indicators; and the reporting subsystem does not send the entire matrix of granular-level resource status indicators to the monitoring device.

In an embodiment, the networked devices are switches, the first objects are egress ports, the multiple categories correspond to ingress ports, and the granular-level status indicators indicate congestion levels.

In an embodiment, the counting subsystem is further configured to store delayed counters of the aggregate-level resource assignments; store intermediate counters for the delayed counters that reflect changes in aggregate-level resource assignments since last update times for the delayed counters; and recurrently update the delayed counters using the intermediate counters.

According to an embodiment, a method comprises: tracking aggregate resource utilization for objects in a first set of objects; identifying priority objects in the first set that satisfy prioritization criteria based at least in part on the aggregate resource utilization; tracking granular resource utilization for the objects in a manner that emphasizes the priority objects over non-priority objects in the first set; updating a display of resource utilization information using a latest set of the tracked granular resource utilization.

In an embodiment, tracking the granular resource utilization for the objects in a manner that emphasizes the priority objects over the non-priority objects comprises not tracking granular resource utilization for the non-priority objects.

In an embodiment, tracking the granular resource utilization for the objects in a manner that emphasizes the priority objects over the non-priority objects comprises updating granular resource utilization for the priority objects more frequently than for the non-priority objects.

In an embodiment, the method further comprises: selecting different prioritization criteria for different objects in the first set.

In an embodiment, the objects are ports within a network switching device, and the resource utilization corresponds to messages received by the network switching device.

In an embodiment, the display is a two-dimensional heatmap of the tracked granular resource utilization, the heatmap including placeholder values for at least a set of non-priority objects for which there is no granular resource information in the latest set of the tracked granular resource utilization.

According to an embodiment, a method comprises: tracking aggregate resource utilization for objects in a first set of objects; identifying priority objects in the first set that satisfy prioritization criteria based at least in part on the aggregate resource utilization; tracking granular resource utilization for at least the priority objects; sending granular resource utilization information to a reporting application in a manner that emphasizes the priority objects over non-priority objects in the first set.

In an embodiment, sending the granular resource utilization information to the reporting application in a manner that emphasizes the priority objects over the non-priority objects comprises not sending granular resource utilization for the non-priority objects to the reporting application.

In an embodiment, sending the granular resource utilization information to the reporting application in a manner that emphasizes the priority objects over the non-priority objects comprises sending updates to the granular resource utilization information for the priority objects more frequently than for the non-priority objects.

In an embodiment, the method further comprises: tracking granular resource utilization for the objects in a manner that emphasizes the priority objects over the non-priority objects.

In an embodiment, the method further comprises: updating a display at the reporting application with a latest set of the received granular resource utilization information, the display including placeholder values for at least some of the non-priority objects, the placeholder values not sent in the granular resource utilization information.

In an embodiment, the objects are ports within a network switching device, the resource utilization corresponds to messages received by the network switching device, and the reporting application executes on a device external to the network switching device.

According to an embodiment, a method comprises: tracking an aggregate count of resources assigned for each object in a first set of objects; updating resource status information for each object in the first set by comparing a current aggregate count of resource assignments for the object to one or more aggregate thresholds for the object, the resource status information including a priority indicator indicating whether the object has a priority status; identifying priority objects within the first set that currently have the priority status; tracking granular counts of resource assignments for each particular object of at least the priority objects, each of the granular counts for the particular object counting resources assigned to a different combination of the particular object with another object in a second set of objects; based on the tracked granular counts, generating a report of granular measures of resource assignments for objects in the first set of objects, each of the granular measures for a particular object reflecting how many resources have been assigned to a different combination of the particular object with another object in the second set of objects; selecting specific objects in the first set for which to track the granular counts and/or whose granular measures are to be included in the report based on which objects in the first set are identified as priority objects.

In an embodiment, the method further comprises: selecting the specific objects in the first set whose granular measures are to be included in the report, the specific objects being only those objects in the first set that are currently priority objects; sending the report as a set of one or more messages to a receiver; wherein the receiver is configured to generate a presentation of granular measures for the first set in which granular measures for objects other than the specific objects are presented using placeholder values.

In an embodiment, the method further comprises: selecting the specific objects in the first set for which to track the granular counts, wherein granular counts are only tracked for objects in the first set that are currently priority objects.

In an embodiment, the method further comprises: recurrently performing the method over multiple iterations, the identified priority objects changing between at least a first of the iterations and a second of the iterations on account of changes to the resources assigned to certain objects in the first set.

In an embodiment, the method further comprises: generating a multi-dimensional presentation of the granular measures, a first dimension of the presentation corresponding to the first set of objects and a second dimension of the presentation corresponding to the second set of objects, the presentation including placeholder values for granular measures corresponding to combinations of objects that do not include the priority objects.

In an embodiment, the granular measures are granular status indicators, the method further comprising determining the granular status indicators by comparing associated granular thresholds with the granular counts.

In an embodiment, at least a first object in the first set has a different associated granular threshold than a second object in the first set.

In an embodiment, at least a first object in the first set has a different aggregate threshold than a second object in the first set.

In an embodiment, the granular measures are the granular counts.

In an embodiment, the method further comprises: determining whether to assign resources to certain objects in the first set based on the resource status information for the certain objects.

In an embodiment, the method further comprises: using the resource status information to determine at least one of: whether to buffer or to drop a message that has been routed to or through a given object in the first set, whether to apply flow control to a message that has been routed to or through a given object in the first set, or whether to mark a message that has been routed to or through a given object in the first set with a particular flag.

In an embodiment, the method further comprises: storing each aggregate count in a delayed counter that reflects resource assignments for a corresponding object in the first set as of a last sample time for the corresponding object; maintaining an intermediate counter for each aggregate count that reflects changes in resource assignments for the corresponding object since the last sample time for the corresponding object; updating the aggregate count using the intermediate counter at each of a plurality of sample times for the corresponding object.

In an embodiment, the method further comprises: determining the sample times for each object in the first set based at least partially upon the resource status information.

In an embodiment, the method further comprises: storing full status counters in one or more first memories, the full status counters including each aggregate count; storing intermediate counters in one or more second memories, the one or more second memories being different than the one or more first memories, each of the intermediate counters corresponding to a different one of the full status counters; incrementing the intermediate counters responsive to resource assignments for corresponding objects in the first set; decrementing the intermediate counters responsive to unassigning resources for corresponding objects in the first set; updating the full status counters at sample times based on the intermediate counters.

Other examples of these and other embodiments are found throughout this disclosure.

6.0. IMPLEMENTATION MECHANISM—HARDWARE OVERVIEW

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, or FPGAs with custom programming to accomplish the techniques.

Though the foregoing techniques are described with respect to a hardware implementation, which provides a number of advantages in certain embodiments, it will also be recognized that, in another embodiment, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 9:
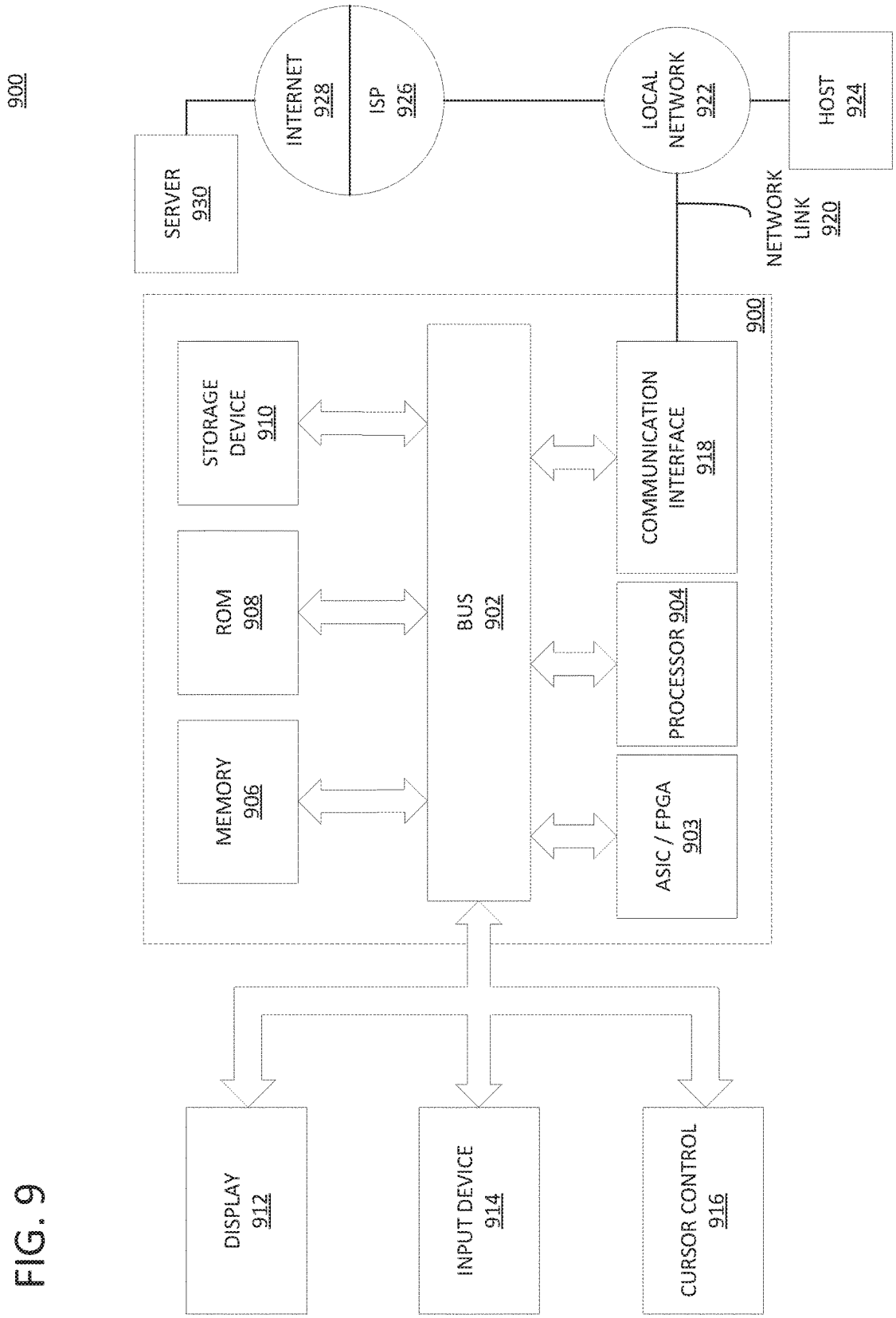
FIG. 9 is block diagram of a computer system upon which embodiments of the invention may be implemented.

FIG. 9 is a block diagram that illustrates a computer system 900 that may be utilized in implementing the above-described techniques, according to an embodiment. Computer system 900 may be, for example, a desktop computing device, laptop computing device, tablet, smartphone, server appliance, computing mainframe, multimedia device, handheld device, networking apparatus, or any other suitable device.

Computer system 900 may include one or more ASICs, FPGAs, or other specialized circuitry 903 for implementing program logic as described herein. Additionally, and/or instead, computer system 900 may include one or more hardware processors 904. Computer system 900 may also include one or more busses 902 or other communication mechanism for communicating information. Busses 902 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 900 also includes one or more memories 906, such as a random access memory (RAM), registers, or other dynamic or volatile storage device for storing data units to be processed by the one or more ASICs, FPGAs, or other specialized circuitry 903. Memory 906 may also or instead be used for storing information and instructions to be executed by processor 904. Memory 906 may be directly connected or embedded within circuitry 903 or a processor 904. Or, memory 906 may be coupled to and accessed via bus 902. Memory 906 also may be used for storing temporary variables, data units describing rules or policies, or other intermediate information during execution of program logic or instructions.

Computer system 900 further includes one or more read only memories (ROM) 908 or other static storage devices coupled to bus 902 for storing static information and instructions for processor 904. One or more storage devices 910, such as a solid-state drive (SSD), magnetic disk, optical disk, or other suitable non-volatile storage device, may optionally be provided and coupled to bus 902 for storing information and instructions.

A computer system 900 may also include, in an embodiment, one or more communication interfaces 918 coupled to bus 902. A communication interface 918 provides a data communication coupling, typically two-way, to a network link 920 that is connected to a local network 922. For example, a communication interface 918 may be an integrated services digital network (ISDN) card, cable modem, satellite modem, or a modem to provide a data communication connection to a corresponding type of telephone line. As another example, the one or more communication interfaces 918 may include a local area network (LAN) card to provide a data communication connection to a compatible LAN. As yet another example, the one or more communication interfaces 918 may include a wireless network interface controller, such as a 802.11-based controller, Bluetooth controller, Long Term Evolution (LTE) modem, and/or other types of wireless interfaces. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by a Service Provider 926. Service Provider 926, which may for example be an Internet Service Provider (ISP), in turn provides data communication services through a wide area network, such as the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

In an embodiment, computer system 900 can send messages and receive data through the network(s), network link 920, and communication interface 918. In some embodiments, this data may be data units that the computer system 900 has been asked to process and, if necessary, redirect to other computer systems via a suitable network link 920. In other embodiments, this data may be instructions for implementing various processes related to the described techniques. For instance, in the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution. As another example, information received via a network link 920 may be interpreted and/or processed by a software component of the computer system 900, such as a web browser, application, or server, which in turn issues instructions based thereon to a processor 904, possibly via an operating system and/or other intermediate layers of software components.

Computer system 900 may optionally be coupled via bus 902 to one or more displays 912 for presenting information to a computer user. For instance, computer system 900 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 912 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 912.

One or more input devices 914 are optionally coupled to bus 902 for communicating information and command selections to processor 904. One example of an input device 914 is a keyboard, including alphanumeric and other keys. Another type of user input device 914 is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. Yet other examples of suitable input devices 914 include a touch-screen panel affixed to a display 912, cameras, microphones, accelerometers, motion detectors, and/or other sensors. In an embodiment, a network-based input device 914 may be utilized. In such an embodiment, user input and/or other information or commands may be relayed via routers and/or switches on a Local Area Network (LAN) or other suitable shared network, or via a peer-to-peer network, from the input device 914 to a network link 920 on the computer system 900.

As discussed, computer system 900 may implement techniques described herein using customized hard-wired logic, one or more ASICs or FPGAs 903, firmware and/or program logic, which in combination with the computer system causes or programs computer system 900 to be a special-purpose machine. According to one embodiment, however, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 900 can receive the data on the network and demodulate the signal to decode the transmitted instructions. Appropriate circuitry can then place the data on bus 902. Bus 902 carries the data to main memory 906, from which processor 904 retrieves and executes the instructions. The instructions received by main memory 906 may optionally be stored on storage device 910 either before or after execution by processor 904.

7.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A networking apparatus comprising:
   communication hardware interfaces coupled to one or more networks, the communication hardware interfaces configured to receive and send messages;
   a switching subsystem configured to process routable messages received over the communication hardware interfaces;
   a tracking subsystem configured to track resources used by the apparatus while processing the routable messages, at least by tracking an aggregate count of resources assigned for each object in a first set of objects, each object in the first set corresponding to one of: an ingress port, egress port, processing queue, or group of ports;
   a status update system configured to update resource status information for each object in the first set by comparing a current aggregate count of resource assignments for the object to one or more thresholds for the object, the resource status information including a priority indicator indicating whether the object has a priority status;
   a reporting subsystem configured to send, to a receiver, granular measures of resource assignments for priority objects within the first set, the priority objects being objects that currently have the priority status, each of the granular measures for a particular object reflecting how many resources have been assigned to a different combination of the particular object with another object in a second set of objects;
   wherein the reporting subsystem is further configured to send the granular measures of resource assignments for the priority objects more frequently than granular measures of resource assignments for other objects in the first set that do not have the priority status.

2. The networking apparatus of claim 1, wherein the networking apparatus is configured to not send the granular measures of resource assignments for the other objects in the first set that do not have the priority status.

3. The networking apparatus of claim 1, wherein the receiver is configured to generate a heat map of granular measures of resource assignments, a first axis of the heat map corresponding to the first set of objects and a second axis of the heat map corresponding to the second set of objects, the receiver further configured to display placeholder values for granular measures depicted in the heat map but not received from the networking apparatus.

4. The networking apparatus of claim 1, further comprising a granular tracking subsystem configured to maintain and update the granular measures for the priority objects within the first set, without maintaining and updating the granular measures for the other objects within the first set that do not currently have the priority status.

5. The networking apparatus of claim 1,
wherein the granular measures are granular status indicators that indicate congestion levels, the granular status indicators further serving as the priority indicators;
wherein the status update system is further configured to determine the granular status indicators by comparing associated granular thresholds with granular counts of pairings of objects from the first set with objects in the second set;
wherein the resources are memory buffers used to store the messages, or portions thereof.

6. The networking apparatus of claim 1, wherein the granular measures are counts of amounts of resources.

7. The networking apparatus of claim 1, further comprising:
a resource assignment subsystem configured to determine whether to assign resources to certain objects based on current resource status information for the certain objects.

8. The networking apparatus of claim 1, wherein the switching subsystem is further configured to use current resource status information to determine one or more of: whether to buffer or to drop a message that has been routed to or through a given object in the first set, whether to apply flow control to a message that has been routed to or through a given object in the first set, or whether to mark a message that has been routed to or through a given object in the first set with a particular flag.

9. The networking apparatus of claim 1,
wherein each aggregate count is stored in a delayed counter that reflects resource assignments for a corresponding object in the first set as of a last sample time for the corresponding object;
wherein the tracking subsystem is further configured to maintain an intermediate counter for each aggregate count that reflects changes in resource assignments for the corresponding object since the last sample time for the corresponding object, and to update the aggregate count using the intermediate counter at each of a plurality of sample times for the corresponding object;
wherein the apparatus further comprises a scheduling subsystem configured to determine the sample times for each object in the first set based at least partially upon the resource status information.

10. The networking apparatus of claim 1, further comprising:
one or more first memories configured to store full status counters, the full status counters including each aggregate count;
one or more second memories configured to store intermediate counters, the one or more second memories being different than the one or more first memories, each of the intermediate counters corresponding to a different one of the full status counters;
wherein the tracking subsystem is further configured to increment the intermediate counters responsive to the communication hardware interfaces receiving the routable messages, to decrement the intermediate counters responsive to the communication hardware interfaces sending the routable messages and/or the routing subsystem disposing of the routable messages, and to update the full status counters at sample times based on the intermediate counters.

11. A method comprising:
tracking an aggregate count of resources assigned for each object in a first set of objects, the objects in the first set corresponding to components of a network device, the components including at least one of: an ingress port, an egress port, a processing queue, or a group of ports;
updating resource status information for each object in the first set by comparing a current aggregate count of resource assignments for the object to one or more aggregate thresholds for the object, the resource status information including a priority indicator indicating whether the object has a priority status;
identifying priority objects within the first set that currently have the priority status;
tracking granular counts of resource assignments for each particular object of at least the priority objects, each of the granular counts for the particular object counting resources assigned to a different combination of the particular object with another object in a second set of objects;
based on the tracked granular counts, generating a report of granular measures of resource assignments for objects in the first set of objects, each of the granular measures for a particular object reflecting how many resources have been assigned to a different combination of the particular object with another object in the second set of objects;
selecting specific objects in the first set for which to track the granular counts and/or whose granular measures are to be included in the report based on which objects in the first set are identified as priority objects.

12. The method of claim 11, further comprising:
selecting the specific objects in the first set whose granular measures are to be included in the report, the specific objects being only those objects in the first set that are currently priority objects;
sending the report as a set of one or more messages to a receiver;
wherein the receiver is configured to generate a presentation of granular measures for the first set in which granular measures for objects other than the specific objects are presented using placeholder values.

13. The method of claim 11, further comprising selecting the specific objects in the first set for which to track the granular counts, wherein the granular counts are only tracked for objects in the first set that are currently priority objects.

14. The method of claim 11, further comprising generating a multi-dimensional presentation of the granular measures, a first dimension of the presentation corresponding to the first set of objects and a second dimension of the presentation corresponding to the second set of objects, the presentation including placeholder values for granular measures corresponding to combinations of objects that do not include the priority objects.

15. The method of claim 11, wherein the granular measures are granular status indicators, the method further comprising determining the granular status indicators by comparing associated granular thresholds with the granular counts.

16. The method of claim 11, wherein the granular measures are the granular counts.

17. The method of claim 11, further comprising using the resource status information to determine at least one of: whether to buffer or to drop a message that has been routed to or through a given object in the first set, whether to apply flow control to a message that has been routed to or through a given object in the first set, or whether to mark a message that has been routed to or through a given object in the first set with a particular flag.

18. The method of claim 11, further comprising:
storing each aggregate count in a delayed counter that reflects resource assignments for a corresponding object in the first set as of a last sample time for the corresponding object;
maintaining an intermediate counter for each aggregate count that reflects changes in resource assignments for the corresponding object since the last sample time for the corresponding object;
updating the aggregate count using the intermediate counter at each of a plurality of sample times for the corresponding object;
determining the sample times for each object in the first set based at least partially upon the resource status information.

19. The method of claim 11, further comprising:
storing full status counters in one or more first memories, the full status counters including each aggregate count;
storing intermediate counters in one or more second memories, the one or more second memories being different than the one or more first memories, each of the intermediate counters corresponding to a different one of the full status counters;
incrementing the intermediate counters responsive to resource assignments for corresponding objects in the first set;
decrementing the intermediate counters responsive to unassigning resources for corresponding objects in the first set;
updating the full status counters at sample times based on the intermediate counters.

20. One or more non-transitory computer-readable storage media storing instructions that, when executed by one or more computing devices, cause performance of:
tracking an aggregate count of resources assigned for each object in a first set of objects, the objects in the first set corresponding to components of a network device, the components including at least one of: an ingress port, an egress port, a processing queue, or a group of ports;
updating resource status information for each object in the first set by comparing a current aggregate count of resource assignments for the object to one or more aggregate thresholds for the object, the resource status information including a priority indicator indicating whether the object has a priority status;
identifying priority objects within the first set that currently have the priority status;
tracking granular counts of resource assignments for each particular object of at least the priority objects, each of the granular counts for the particular object counting resources assigned to a different combination of the particular object with another object in a second set of objects;
based on the tracked granular counts, generating a report of granular measures of resource assignments for objects in the first set of objects, each of the granular measures for a particular object reflecting how many resources have been assigned to a different combination of the particular object with another object in the second set of objects;
selecting specific objects in the first set for which to track the granular counts and/or whose granular measures are to be included in the report based on which objects in the first set are identified as priority objects.

21. The one or more non-transitory computer-readable storage media of claim 20, wherein the instructions, when executed by the one or more computing devices, further cause performance of:
selecting the specific objects in the first set whose granular measures are to be included in the report, the specific objects being only those objects in the first set that are currently priority objects;
sending the report as a set of one or more messages to a receiver;
wherein the receiver is configured to generate a presentation of granular measures for the first set in which granular measures for objects other than the specific objects are presented using placeholder values.

22. The one or more non-transitory computer-readable storage media of claim 20, wherein the instructions, when executed by the one or more computing devices, further cause performance of: selecting the specific objects in the first set for which to track the granular counts, wherein granular counts are only tracked for objects in the first set that are currently priority objects.

23. The one or more non-transitory computer-readable storage media of claim 20, wherein the instructions, when executed by the one or more computing devices, further cause performance of: generating a multi-dimensional presentation of the granular measures, a first dimension of the presentation corresponding to the first set of objects and a second dimension of the presentation corresponding to the second set of objects, the presentation including placeholder values for granular measures corresponding to combinations of objects that do not include the priority objects.

24. The one or more non-transitory computer-readable storage media of claim 20, wherein the instructions, when executed by the one or more computing devices, further cause performance of using the resource status information to determine at least one of: whether to buffer or to drop a message that has been routed to or through a given object in the first set, whether to apply flow control to a message that has been routed to or through a given object in the first set, or whether to mark a message that has been routed to or through a given object in the first set with a particular flag.

25. The one or more non-transitory computer-readable storage media of claim 20, wherein the instructions, when executed by the one or more computing devices, further cause performance of:
storing each aggregate count in a delayed counter that reflects resource assignments for a corresponding object in the first set as of a last sample time for the corresponding object;
maintaining an intermediate counter for each aggregate count that reflects changes in resource assignments for the corresponding object since the last sample time for the corresponding object;
updating the aggregate count using the intermediate counter at each of a plurality of sample times for the corresponding object;
determining the sample times for each object in the first set based at least partially upon the resource status information.

26. The one or more non-transitory computer-readable storage media of claim 20, wherein the instructions, when executed by the one or more computing devices, further cause performance of:
storing full status counters in one or more first memories, the full status counters including each aggregate count;
storing intermediate counters in one or more second memories, the one or more second memories being different than the one or more first memories, each of the intermediate counters corresponding to a different one of the full status counters;

incrementing the intermediate counters responsive to resource assignments for corresponding objects in the first set;

decrementing the intermediate counters responsive to unas signing resources for corresponding objects in the first set;

updating the full status counters at sample times based on the intermediate counters.

* * * * *

UNITED STATES PATENT AND TRADEMARK OFFICE
CERTIFICATE OF CORRECTION

PATENT NO. : 10,218,589 B1  
APPLICATION NO. : 14/973541  
DATED : February 26, 2019  
INVENTOR(S) : Matthews et al.

It is certified that error appears in the above-identified patent and that said Letters Patent is hereby corrected as shown below:

In the Claims

Column 53
Claim 26: Line 8: Delete "unas signing" and insert --unassigning--

Signed and Sealed this
Twenty-sixth Day of March, 2019

Andrei Iancu
*Director of the United States Patent and Trademark Office*